United States Patent
Sasaki et al.

(10) Patent No.: US 7,477,796 B2
(45) Date of Patent: Jan. 13, 2009

(54) METHOD FOR PREPARING COMPRESSED IMAGE DATA FILE, IMAGE DATA COMPRESSION DEVICE, AND PHOTOGRAPHIC DEVICE

(75) Inventors: Hiroshi Sasaki, Tokyo (JP); Eiji Atsumi, Kamakura (JP)

(73) Assignee: Nokia Corporation, Espoo (FI)

( * ) Notice: Subject to any disclaimer, the term of this patent is extended or adjusted under 35 U.S.C. 154(b) by 188 days.

(21) Appl. No.: 11/545,011

(22) Filed: Oct. 6, 2006

(65) Prior Publication Data

US 2007/0098284 A1    May 3, 2007

Related U.S. Application Data

(63) Continuation of application No. PCT/JP2004/005108, filed on Apr. 9, 2004.

(51) Int. Cl.
  *G06K 9/36* (2006.01)
  *G06K 9/46* (2006.01)
  *H04N 7/12* (2006.01)
  *H04N 11/02* (2006.01)
  *H04N 11/04* (2006.01)

(52) U.S. Cl. .................. 382/248; 382/232; 382/250; 348/395.1

(58) Field of Classification Search ................ 382/232, 382/239, 248, 250; 348/395.1, 404.1; 358/426.06; 375/240.02, 240.18, 240.2
See application file for complete search history.

(56) References Cited

U.S. PATENT DOCUMENTS

| | | | | |
|---|---|---|---|---|
| 5,694,170 A | * | 12/1997 | Tiwari et al. | 348/390.1 |
| 5,893,037 A | * | 4/1999 | Reele et al. | 455/556.1 |
| 6,747,762 B1 | * | 6/2004 | Josephsen et al. | 358/453 |
| 6,934,330 B2 | * | 8/2005 | Sugiyama et al. | 375/240.03 |
| 6,940,900 B2 | * | 9/2005 | Takamizawa | 375/240 |
| 2002/0006227 A1 | * | 1/2002 | Takemura | 382/232 |

(Continued)

FOREIGN PATENT DOCUMENTS

JP    3-166887 A    7/1991

(Continued)

OTHER PUBLICATIONS

English translation of PCT Written Opinion of the International Searching Authority in International Application No. PCT/JP2004/005108, Date of Mailing—Jul. 19, 2005.

*Primary Examiner*—Yubin Hung
(74) *Attorney, Agent, or Firm*—Morgan & Finnegan LLP

(57) ABSTRACT

A method for carrying out a step of extracting a portion of a predetermined size from the image data, and a step of preparing a predetermined number of compressed partial data compressed with different compression parameter values by repeating preparation of compressed partial data by compressing the partial data in predetermined format for the predetermined number of times with the compression parameter value used in the predetermined format changed for each compression, on the entire image data. The method also calculates the total of the data sizes of all of the compressed partial data compressed with the same compression parameter value for each of the compression parameter values and prepares the compressed image data file from compressed partial data compressed with a compression parameter value for which the total is not larger than a given threshold and which is the closest value to the threshold.

23 Claims, 13 Drawing Sheets

U.S. PATENT DOCUMENTS

| | | | |
|---|---|---|---|
| 2003/0179301 A1* | 9/2003 | Feldis et al. | 348/231.3 |
| 2004/0042668 A1* | 3/2004 | Kaplinsky et al. | 382/232 |

FOREIGN PATENT DOCUMENTS

| | | |
|---|---|---|
| JP | 04-156794 A | 5/1992 |
| JP | 06-054196 A | 2/1994 |
| JP | 07-095415 A | 4/1995 |
| JP | 2000-261805 A | 9/2000 |
| JP | 2003-116006 A | 4/2003 |
| JP | 2003-273800 A | 9/2003 |

* cited by examiner

PRIOR ART

US 7,477,796 B2

METHOD FOR PREPARING COMPRESSED IMAGE DATA FILE, IMAGE DATA COMPRESSION DEVICE, AND PHOTOGRAPHIC DEVICE

RELATED APPLICATION INFORMATION

This application is a continuation of international patent application No. PCT/JP2004/005108 filed Apr. 9, 2004.

BACKGROUND OF THE INVENTION (i) Field of the Invention

This invention relates to a method for preparing a compressed image data file, an image data compression device and a photographic device.

(ii) Description of the Related Art

In recent years, cameras have been increasingly incorporated into electronic devices including personal computers, PDAs and cellular phones. Like conventional digital cameras which are used specifically for photography, these devices are also capable of photographing still images and moving images. To inform a user of how many more pictures can be taken, a digital camera which is a device used specifically for photography generally has a function of estimating the number of pictures that can be still taken. In the era of film cameras, it was possible to clearly know the number of pictures that can be still taken since one film is physically consumed by each photographing. However, in the case of digital cameras which store pictures as digital data, users cannot clearly know the number of pictures that can be still taken without any devices since the data size of image data file produced by each photographing is generally not a constant value. If the number of pictures that can be still taken cannot be known, it is difficult for users to form a photographing plan, which is inconvenient for the users. Accordingly, conventional digital cameras used specifically for photography have a function of estimating the number of pictures that can be still taken by suppressing a variation in the data size of image data file produced by each photographing and keeping the data size as constant as possible.

The reason why the data size of image data file varies for each photographing in a digital camera is that the image data is compressed. To store as many image data in a data recording medium as possible, the image data are generally stored in the data recording medium in a compressed form. One or more compression parameters are associated with this compression, and in compression in JPEG format which is used in current digital cameras, compression parameters called Q factors and Q tables are associated with the compression. The data sizes of image data after compression vary depending on the contents of photographed images even if the image data are compressed with the same parameter. For this reason, when the same compression parameter value is used for all image data, the size of data file of produced compressed image varies for each photographing, and it turns out to be difficult to estimate the number of pictures that can be still taken. Consequently, as described in Japanese Patent Application Laid-Open No. 233373/1992, conventional devices used specifically for photography compress image data prepared by photographing with different compression parameter values, and when the image data could be compressed to a desired data size, the devices use the compressed image data for an image data file which is stored at the end, i.e. a compressed image data file to keep the data size of compressed image data file to be produced constant. Therefore, the value of compression parameter used for compression of image data differs for each photographing.

A method for preparing compressed image data in a conventional device used specifically for photography will be described by use of FIG. 13. FIG. 13 is a block diagram illustrating a conventional device used specifically for photography. A digital camera 202 which is a device used specifically for photography comprises a lens 204, a solid-state image sensor 206, an A/D converter 208, an image processing DSP 210, a CPU 212, a main storage unit 214, an external storage unit 216, a display 218 and a user interface 220 such as a shutter button. The digital camera 202 exchanges signals with these units via a bus 222. At the press of the shutter button of the user interface 220, the CPU 212 issues a command to initiate photographing, light having passed through the lens 204 is converted into an electrical signal by the solid-state image sensor 206, and the electrical signal is digitized by the A/D converter 208 and then stored in the main storage unit 214 temporarily. All signals output from all picture elements of the solid-state image sensor 206 are stored in the main storage unit 214 as digital data. Then, the DSP 210 reads out the digitized output signals of the solid-state image sensor 206 which are stored in the main storage unit 214 and prepares image data corresponding to one photographed frame from the data. The image data is in RGB format or YUV format. The DSP 210 stores the prepared image data corresponding to one frame in the main storage unit 214 temporarily.

Then, the DSP 210 reads out the prepared image data corresponding to one frame from the main storage unit 214, compresses the image data in JPEG format with a compression parameter set at a predetermined value to prepare a compressed image data file, and measures the data size of the compressed image data file. If the data size is not a desired data size, the DSP 210 discards the compressed image data file, reads out the prepared image data from the main storage unit 214 again, compresses the image data in JPEG format with a different compression parameter value and measures the data size after compression. The DSP 210 repeats the above operations to prepare compressed image data which is a final output from image data compressed with a compression parameter value with which the desired data size is achieved and stores the compressed image data in the external storage unit 216.

In summary, to keep the data sizes of compressed image data files obtained by compressing image data as constant as possible, the method for preparing a compressed image data file which is implemented in conventional digital cameras comprises compressing entire image data to be compressed with a compression parameter value, checking the size of the compressed data, and compressing the entire image data to be compressed again with another compression parameter value when the size of the compressed data is larger than a desired size.

SUMMARY OF THE INVENTION

As described above, to estimate the number of photographs that can be still taken, it is necessary to suppress a variation in the data sizes of image data files to be stored which are produced by photographing and keep a capacity in a recording medium which is consumed by each photographing as constant as possible. That is, it is necessary to keep the data sizes of compressed image data files obtained by compressing image data as constant as possible. To fulfill the requirement, a method for preparing a compressed image data file according to the present invention is characterized as follows and different from the prior art in the following respect. More specifically, to prepare a compressed image data file by compressing image data to be compressed, the method of the present invention carries out:

a step of extracting a portion of a predetermined size from the image data to be compressed, and a step of preparing a predetermined number of compressed partial data compressed with different compression parameter values from the partial data by repeating preparation of compressed partial data by compressing the partial data in predetermined format for the predetermined number of times with the compression parameter value used in the predetermined format changed for each compression, on the entire image data to be compressed, and the method of the present invention also calculates the total of the data sizes of all of the compressed partial data compressed with the same compression parameter value for each of the compression parameter values and prepares the compressed image data file which is to be a final output from compressed partial data compressed with a compression parameter value for which the total is not larger than a given threshold and which is the closest value to the threshold. The predetermined format used for compression may be a JPEG format. When compression in the JEPG format is used, Q factors or Q tables defined in the JPEG format can be used as the compression parameters which are changed during the repeating process.

The present invention includes the following image data compression device. That is, the image data compression device is an image data compression device which compresses image data to prepare a compressed image data file, the device comprising:

partial data acquiring means, interleave compression means, and data file preparing means, wherein the partial data acquiring means acquires a portion of a predetermined size from the image data to be compressed, the interleave compression means prepares a number of compressed partial data compressed with different compression parameter values from the partial data by repeating preparation of compressed partial data by compressing the partial data in predetermined format for a predetermined number of times with the compression parameter value used in the predetermined format changed for each compression and outputs the compressed partial data sequentially, and the data file preparing means calculates the total of the data sizes of all of the compressed partial data compressed with the same compression parameter value for each of the compression parameter values and prepares the compressed image data file from compressed partial data compressed with a compression parameter value for which the total is not larger than a given threshold and which is the closest value to the threshold. When the total is larger than the threshold for all of the compression parameter values, the compressed image data file may be prepared from compressed partial data compressed with a compression parameter value for which the total is the smallest. The predetermined format used for compression may be a JPEG format. When compression in the JEPG format is used, Q factors or Q tables defined in the JPEG format can be used as the compression parameters which are changed during the repeating process.

The present invention also includes the following image data compression device. That is, the image data compression device is an image data compression device which compresses image data to prepare a compressed image data file, the device comprising:

an image data compression section, and
a data file preparing section, wherein
(A) the image data compression section comprises:
a partial data acquiring section,
an interleave compression section, and
a data output section,
(A1) the partial data acquiring section takes in a portion of a predetermined size from the image data to be compressed and stores the partial data temporarily,
(A2) the interleave compression section compresses the partial data stored in the partial data acquiring section in predetermined format to prepare compressed partial data,
(A3) the data output section outputs the compressed partial data,
(A4) the interleave compression section comprises a number of compression parameter values used in the predetermined format and prepares a number of compressed partial data compressed with different compression parameter values from the partial data,
(A5) the data output section outputs the compressed partial data sequentially,
(B) the data file preparing section comprises:
a data input section,
a data storing section,
a data size calculating section,
a data size determining section, and
a data shaping section,
(B1) the data input section inputs the compressed partial data output from the data output section,
(B2) the data storing section stores the compressed partial data input from the data input section,
(B3) the data size calculating section calculates the total of the data sizes of all of compressed partial data prepared from the same image data and compressed with the same compression parameter value out of the compressed partial data input from the data input section for each of the different compression parameter values,
(B4) the data size determining section determines that a compression parameter value for which the total is not larger than a given threshold and which is the closest value to the threshold is an optimum compression parameter value, and
(B5) the data shaping section prepares the compressed image data file from compressed partial data compressed with the optimum compression parameter value.

The data size determining section may be so constituted as to determine that a compression parameter value for which the total is the smallest is an optimum compression parameter value when the total is larger than the threshold for all of the compression parameter values. Further, the interleave compression section may be so constituted as to give markers indicating the compression parameter values used for compression to the compressed partial data. The predetermined format used for compression may be a JPEG format. When compression in the JEPG format is used, Q factors or Q tables defined in the JPEG format can be used as the compression parameters. Further, when compression in the JEPG format is used, an RST marker defined in the JPEG format may be used as the marker.

The present invention also includes the following photographic device. That is, the photographic device is a photographic device comprising:
a camera module, and a host module, wherein (A) the camera module comprises:

a sensor section, an image data preparing section, a camera-module-side data storing section, a partial data acquiring section, an interleave compression section, and a data transmitting section, (A1) the sensor section converts incoming light into an electrical signal, (A2) the image data preparing section prepares image data from the electrical signal, (A3) the camera-module-side data storing section stores a part or all of the image data temporarily, (A4) the partial data acquiring section takes in a portion of a predetermined size from the image data stored in the camera-module-side data storing section and stores the partial data temporarily, (A5) the interleave compression section compresses the partial data stored in the partial data acquiring section in predetermined format to prepare compressed partial data, (A6) the data transmitting section transmits the compressed partial data to the host module, (A7) the interleave compression section comprises a number of compression parameter values used in the predetermined format and prepares a number of compressed partial data compressed with different compression parameter values from the partial data, (A8) the data transmitting section transmits the compressed partial data sequentially, (B) the host module comprises:

a data receiving section, a host-side data storing section, a data size calculating section, a data size determining section, a data shaping section, and a storage unit, (B1) the data receiving section receives the data transmitted from the camera module, (B2) the host-side data storing section stores the compressed partial data received by the data receiving section, (B3) the data size calculating section calculates the total of the data sizes of all of compressed partial data prepared from the same image data and compressed with the same compression parameter value out of the compressed partial data received by the data receiving section for each of the different compression parameter values, (B4) the data size determining section determines that a compression parameter value for which the total is not larger than a given threshold and which is the closest value to the threshold is an optimum compression parameter value, (B5) the data shaping section prepares a compressed image data file including information of the entirely compressed image data from compressed partial data compressed with the optimum compression parameter value, and (B6) the storage unit stores the compressed image data file.

The data size determining section may be so constituted as to determine that a compression parameter value for which the total is the smallest is an optimum compression parameter value when the total is larger than the threshold for all of the compression parameter values.

The host module may have a telephone function. For example, the host module may have a telephone function using CDMA.

Further, the following embodiment can be applied when it is desired to have the photographic device according to the present invention have a function of previewing a photographed image. That is, the camera module may be so constituted that the image data preparing section prepares preview image data for preview from the electrical signal before preparing the image data and the data transmitting section transmits the preview image data to the host module before transmitting the compressed partial data, and the host module may be so constituted as to comprise a display device and receive the preview image data and displays it on the display device.

In another embodiment when it is desired to have the photographic device according to the present invention have a preview function, the camera module may be so constituted that the data compression section prepares partial data for preview image whose resolution is lower than the partial data from the partial data and the data transmitting section transmits the partial data for preview image prepared from the partial data and the compressed partial data sequentially, and the host module maybe so constituted as to comprise a display device and store the partial data for preview image in the host-side data storing section, prepare image data for preview of the image data from the partial data for preview image which is stored in the host-side data storing section by the data shaping section and display the image data for preview on the display device.

In the photographic device according to the present invention, the interleave compression section may be so constituted as to give markers indicating the compression parameter values used for compression to the compressed partial data. The predetermined format used for compression may be a JPEG format. When compression in the JEPG format is used, Q factors or Q tables defined in the JPEG format can be used as the compression parameter values. Further, when compression in the JEPG format is used, an RST marker defined in the JPEG format may be used as the marker.

DETAILED DESCRIPTION OF THE PREFERRED EMBODIMENTS

Hereinafter, the best mode for carrying out the present invention will be described with reference to the attached drawings.

A method for preparing a compressed image data file according to the present invention is a method for preparing a compressed image data file by compressing image data, the method carries out:

(1) a step of extracting a portion of a predetermined size from the image data, and (2) a step of preparing a predetermined number of compressed partial data compressed with different compression parameter values from the partial data by repeating preparation of compressed partial data by compressing the partial data in predetermined format for the predetermined number of times with the compression parameter value used in the predetermined format changed for each compression, on the entire image data, and the method also calculates the total of the data sizes of all of the compressed partial data compressed with the same compression parameter value for each of the compression parameter values and prepares the compressed image data file from compressed partial data compressed with a compression parameter value for which the total is not larger than a given threshold and which is the closest value to the threshold. The method for preparing a compressed image data file can be implemented by the hardware configuration of an image data compression device as shown in FIG. 1, for example.

Figure 1:
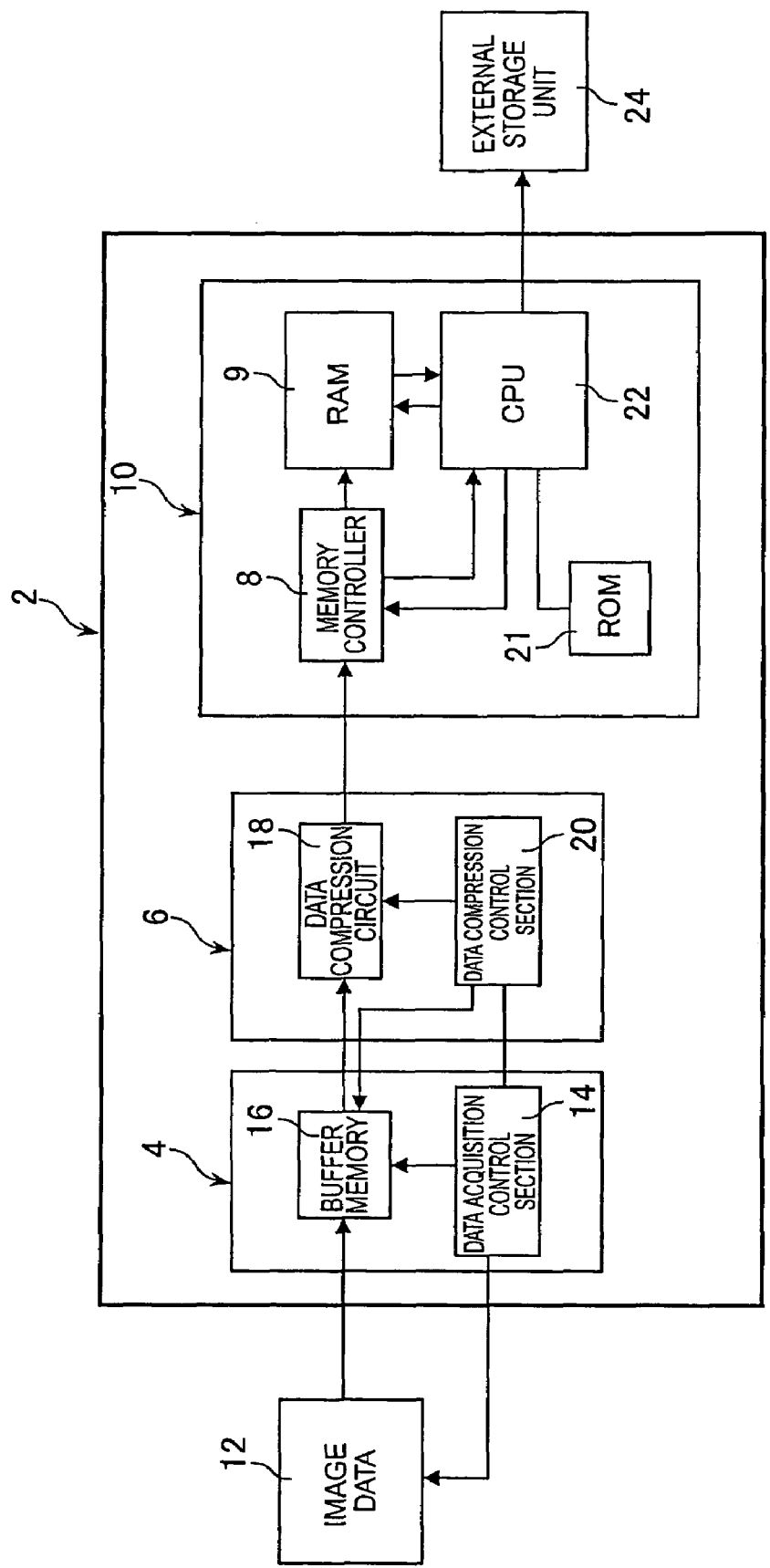
FIG. 1 is a block diagram illustrating an image data compression device according to the present invention.

FIG. 1 is a diagram illustrating functional blocks of image data compression device according to the present invention. An image data compression device 2 comprises a partial data acquiring section 4, an interleave compression section 6, and a data file preparing section 10.

The partial data acquiring section 4 comprises a data acquisition control section 14 which controls extraction of partial data that constitutes a portion of original image data 12 to be compressed and a buffer memory 16 which stores extracted partial data temporarily. The buffer memory 16 does not have to store all of the image data, and it is sufficient that the buffer memory 16 stores only a portion of the image data. Accordingly, the buffer memory 16 does not have to have a large capacity.

The interleave compression section 6 comprises a data compression circuit 18 which compresses the partial data stored in the buffer memory 16 in predetermined format to prepare compressed partial data and a data compression control section 20 which controls the operation and compression parameter values of the data compression circuit 18. The data compression circuit 18 has a number of compression parameter values used in the foregoing predetermined format. The compression format may be a well-known JPEG format. When JPEG is used as the compression format, Q factors and a Q table that are defined in the JPEG format are available as compression parameters. When the values of these compression parameters are changed, the size and image quality of compressed data are changed. The data compression control section 20 prepares a plurality of compressed partial data compressed by use of different compression parameter values from the partial data stored in the buffer memory 16 by causing the data compression circuit 18 to operate for a predetermined number of times with the value of the compression parameter changed for each operation. Accordingly, a plurality of compressed partial data prepared from partial data by use of different compression parameter values are output from the interleave compression section 6 sequentially.

The data file preparing section 10 comprises a memory controller 8, a RAM 9, a ROM 21 and a CPU 22. The RAM 9 stores the compressed partial data output from the interleave compression section 6. The RAM 9 must have a significantly larger capacity than the buffer memory 16 since it must store all compressed partial data prepared from the image data 12 to be compressed. The memory controller 8 allocates the addresses of storage locations in the RAM 9 to the compressed partial data output from the interleave compression section 6 according to compression parameter values used for compression so that partial data compressed with the same compression parameter value are collectively stored in the same area in the RAM 9. The ROM 21 stores a program which causes the CPU 22 to operate as an information processing unit. The CPU 22 checks the data stored in the RAM 9, calculates the total of the data sizes of all compressed partial data compressed with the same compression parameter value for each compression parameter value and prepares a compressed image data file that is a final output of the image data compression device 2 from compressed partial data compressed with a compression parameter value for which the total is not larger than a given threshold and which is the closest value to the threshold, in accordance with the program stored in the ROM 21. The compressed image data file results from compression of the entire original image data 12. For example, when a JPEG format is used as the predetermined format, the compressed image data file is prepared in standard JPEG file format. The prepared compressed image data file is stored in the external storage unit 24 or output to an external device as it is.

Figure 2:
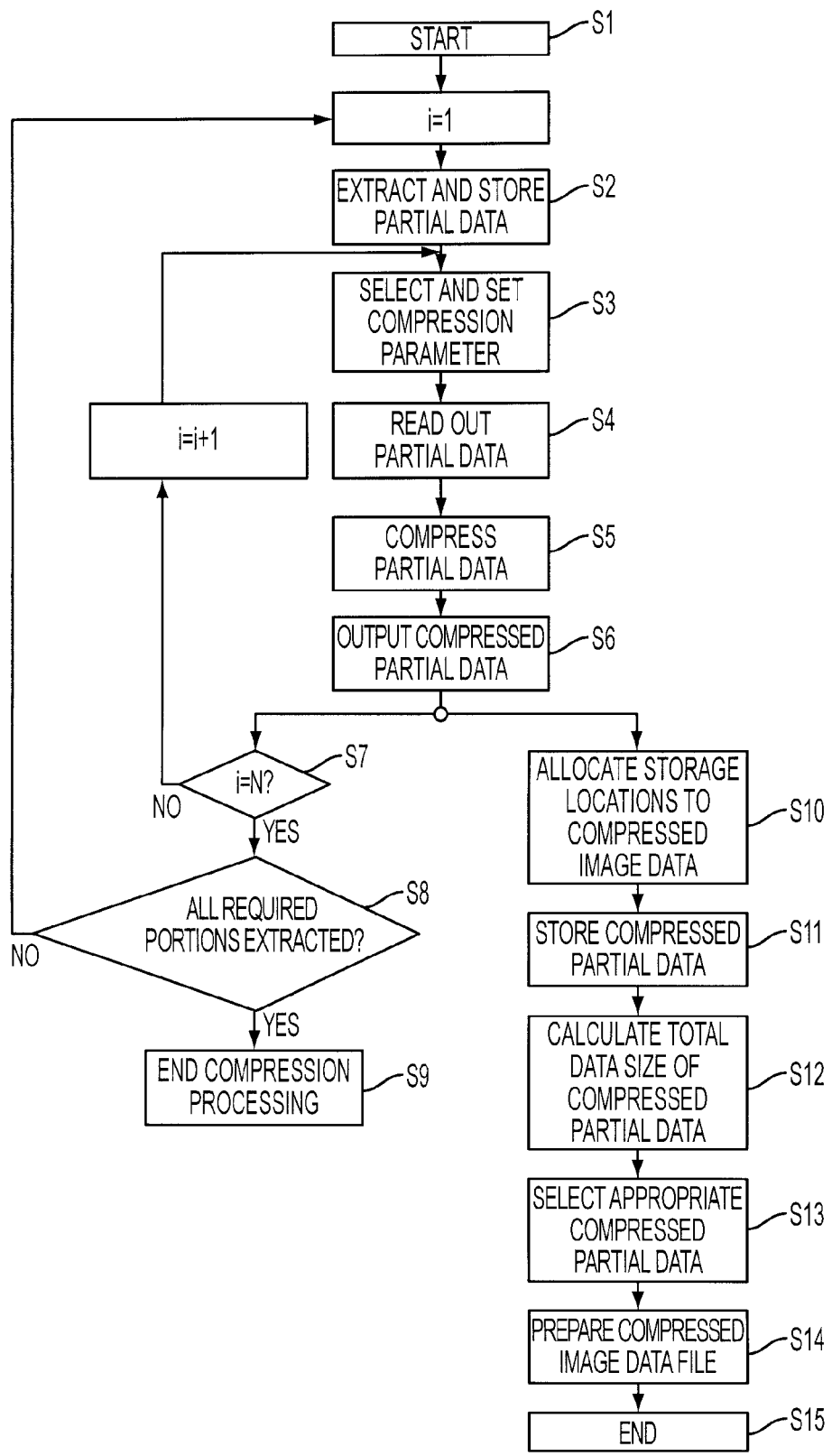
FIG. 2 is a flowchart illustrating the operation of the image data compression device according to the present invention.

Next, the operation of the image data compression device 2 according to the present invention will be described by use of a flowchart of FIG. 2. First, processing is initiated in STEP S1. In STEP S2, the data acquisition control section 14 extracts a portion of a predetermined size from the original image data 12 to be compressed that is stored in storage means and stores the portion in the buffer memory 16. In STEP S3, the data compression control section 20 selects and sets the compression parameter value of the data compression circuit 18. In STEP S4, the data compression control section 20 reads out the partial data stored in the buffer memory 16. STEP S4 may be carried out before STEP S3 or STEPS S3 and S4 may be carried out simultaneously. In STEP S5, the data compression circuit 18 compresses the partial data read out in STEP S4 in predetermined format by use of the compression parameter value set in STEP S3 to prepare compressed partial data. In STEP S6, the prepared compressed partial data is output from the interleave compression section 6.

In STEP S7, it is determined whether STEPS S3 to S6 have been repeated for a predetermined number of times. If not, the data compression control section 20 returns to STEP S3. The data compression control section 20 sets the value of the compression parameter of the data compression circuit 18 at a value different from the last value each time it repeats STEP S3. As a result, a number of compressed partial data compressed with different compression parameter values are prepared from partial data, and these compressed partial data are output from the interleave compression section 6 sequentially. After repeating STEPS S3 to S6 for the number of compression parameter values used, the data compression control section 20 proceeds to STEP S8. In STEP S8, it is determined whether all required portions of the image data 12 to be compressed have been extracted. If not, the data compression control section 20 returns to STEP S2, and the data acquisition control section 14 discards the partial data stored in the buffer memory 16, extracts partial data different from the previously extracted partial data from the image data 12 to be compressed and stores the newly extracted partial data in the buffer memory 16. STEPS S3 to S6 are also repeated for the partial data which has been newly stored in the buffer memory 16 for the number of compression parameter values used, and a number of compressed partial data prepared from this partial data are output from the interleave compression section 6 sequentially. As a result of repetitions in STEPS S7 and S8, an output from the interleave compression section 6 is an output resulting from interleaving data compressed with a compression parameter value by data compressed with another compression parameter value. These will be described by use of FIGS. 3 and 4 hereinafter.

Figure 3:
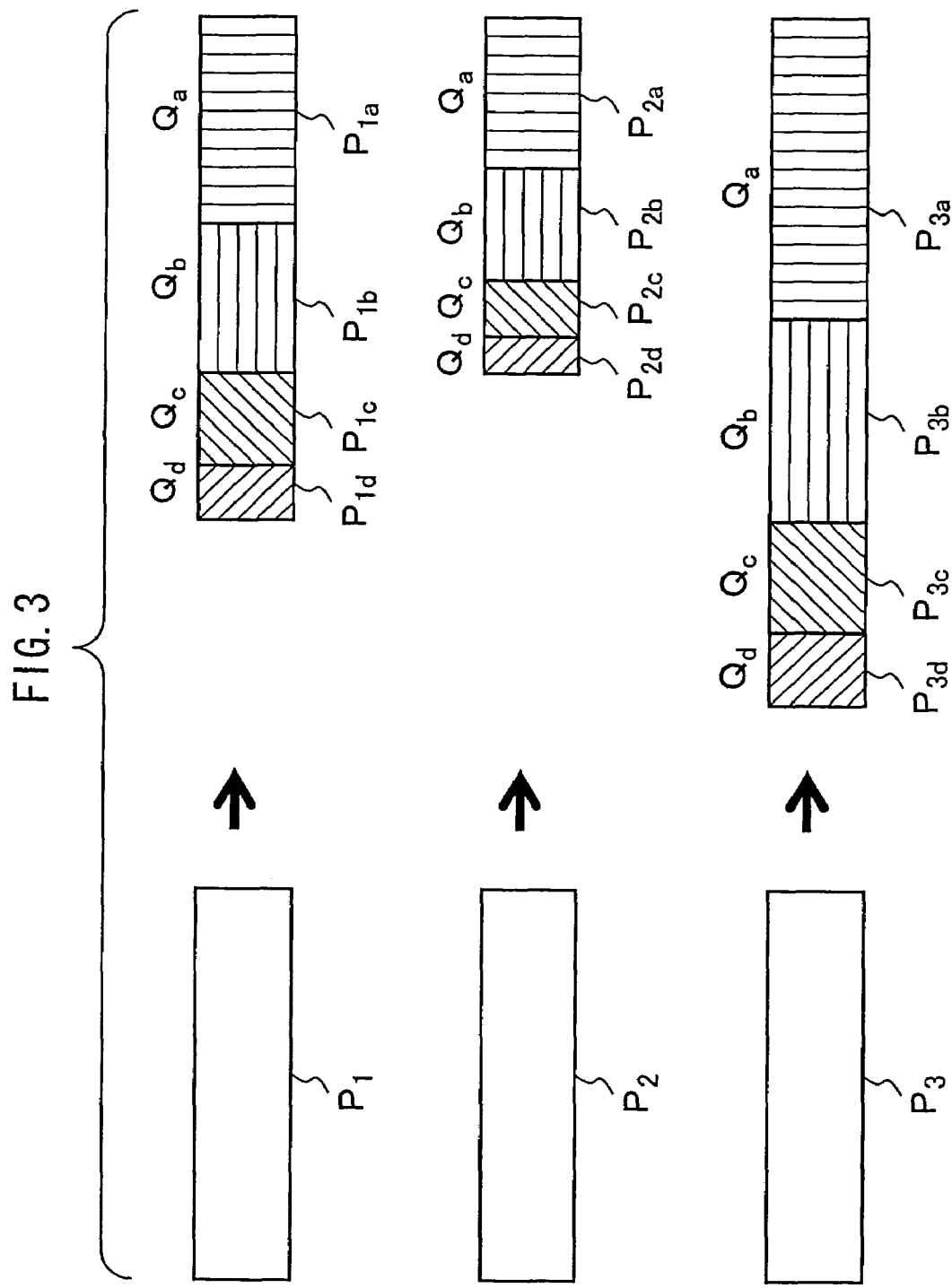
FIG. 3 is a diagram illustrating interleave compression according to the present invention.

FIG. 3 is a schematic diagram illustrating compression by the interleave compression section 6. In FIG. 3, $P_1$, $P_2$ and $P_3$ represent partial data which constitute different portions of the original image data 12. When $P_1$ is stored in the buffer memory 16 in STEP S2 shown in FIG. 2, the data compression control section 20 sets the value of the compression parameter of the data compression circuit 18 at $Q_a$ (STEP S3), reads out the partial data $P_1$ from the buffer memory 16 (STEP S4), and compresses the retrieved $P_1$ with the compression parameter value $Q_a$ to prepare compressed partial data $P_{1a}$ (STEP S5). The prepared compressed partial data $P_{1a}$ is output from the interleave compression section 6 (STEP S6). If returning to STEP S3 by STEP S7, the data compression control section 20 sets the value of the compression parameter of the data compression circuit 18 at $Q_b$ which is different from $Q_1$ and reads out the partial data $P_1$ stored in the buffer memory 16 (STEPS S3 and S5). Then, the data compression circuit 18 compresses the partial data $P_1$ with the parameter value $Q_a$ to prepare compressed partial data $P_{1b}$ (STEP S5). Likewise, compressed partial data $P_{1c}$ is prepared by compressing the partial data $P_1$ with a parameter value $Q_c$, and compressed partial data $P_{1d}$ is prepared by compressing the partial data $P_1$ with a parameter value $Q_d$.

After repeating STEPS S3 to S6 for the number of compression parameter values used, the data compression control section 20 returns to STEP S2 and discards the partial data $P_1$ stored in the buffer memory 16, extracts new partial data $P_2$ from the image data 12 and stores the partial data $P_2$ in the buffer memory 16. As in the case of the partial data $P_1$, $P_2$ is compressed with the different parameter values $Q_a$ to $Q_d$ to prepare compressed partial data $P_{2a}$ to $P_{2d}$ which are then output sequentially (STEPS S3 to S6). Upon completion of processing of the partial data $P_2$, the data compression control section 20 returns to STEP S2 again (STEP S8), and the next partial data $P_3$ is extracted, compressed with the different parameter values $Q_a$ to $Q_d$ to prepare compressed partial data $P_{3a}$ to $P_{3d}$ which are then output sequentially (STEPS S3 to S7). Eventually, a series of data output from the interleave compression section 6 become those shown FIG. 4, for example.

Figure 4:
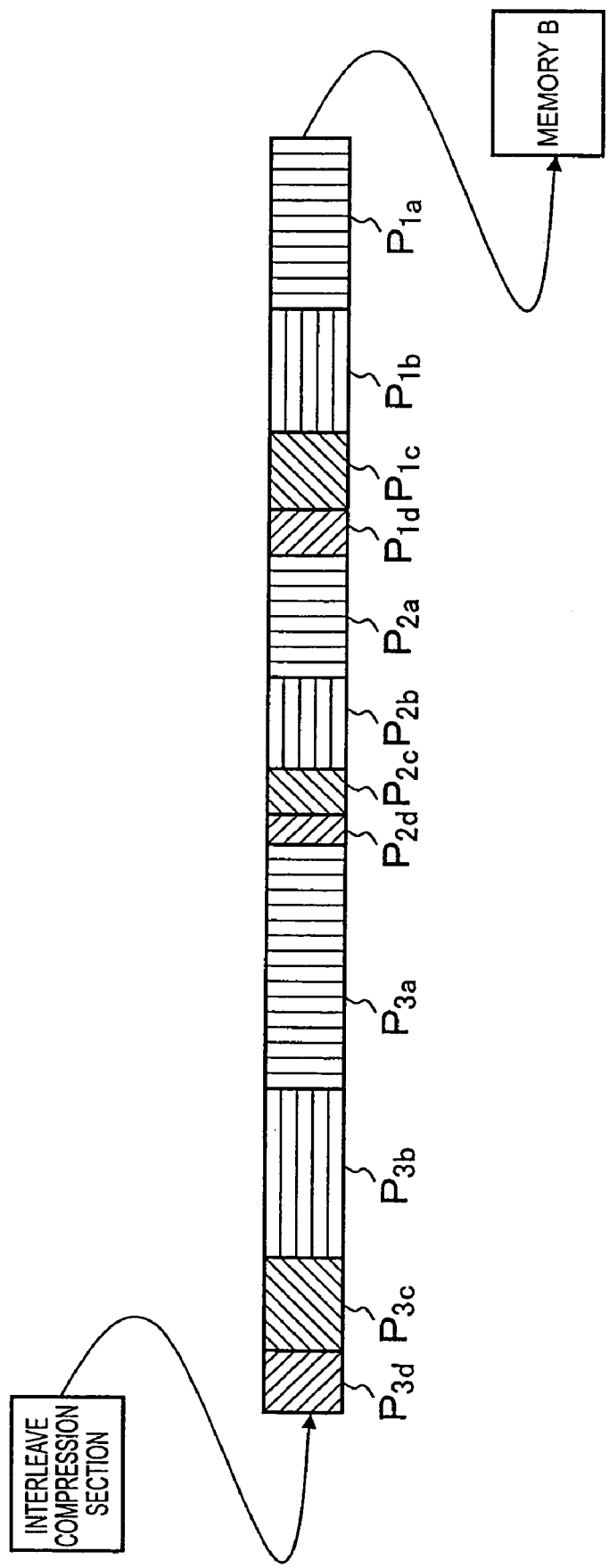
FIG. 4 is a diagram illustrating data output from an interleave compression section of the image data compression device according to the present invention.

FIG. 4 is a schematic diagram illustrating data output from the interleave compression section 6. As is clear from FIG. 4, unlike the prior art, the outputs from the interleave compression section 6 do not take a form that data compressed with the same compression parameter value are continued sequentially. Instead, these outputs take a form that compressed data obtained by compressing the same partial data with different compression parameter values are continued to a certain point and compressed data obtained by compressing another partial data with different compression parameter values are continued after the certain point. That is, they are outputs resulting from interleaving data compressed with a compression parameter value by data compressed with another compression parameter value different from the above compression parameter value. This is a characteristic of the present invention. Thus, a compression method which repeats the following two steps, i.e. a step of extracting a portion of a predetermined size from image data to be compressed and a step of preparing a predetermined number of compressed partial data compressed with different compression parameter values from the partial data by repeating preparation of compressed partial data by compressing the partial data in predetermined format for the predetermined number of times with the compression parameter value used in the predetermined format changed for each compression, on the entire image data to be compressed, as described in STEPS S2 to S5, will be referred to as "interleave compression" hereinafter.

Upon completion of processing of the entire image data to be compressed in STEP S8, compression processing is ended (STEP S9). STEPS S2 to S7 do not need to be carried out on all portions of the image data to be compressed, in other words, on portions which may be discarded without compression. For example, when the image data 12 to be compressed is subjected to a thinning process when JPEG is used as a data compression format, the data acquiring control section 14 can be so constituted as not to store portions of the image data 12 which are to be discarded in the buffer memory 16.

Hereinafter, the operation of the image data compression device 2 according to the present invention will be further described with reference to FIG. 2. The compressed partial data output from the interleave compression section 6 in STEP S6 are allocated to appropriate storage locations in the RAM 9 by the memory controller 8 in STEP S15 and actually stored in the RAM 9 in STEP S11. Thus, after compression processing is ended in STEP S9, all compressed partial data prepared by the interleave compression section 6 are stored in the RAM 9 such that compressed partial data compressed with the same compression parameter value are collectively stored in the same area in the RAM 9. In STEP S12, the CPU 22 checks the compressed partial data stored in the RAM 9 and calculates the total of the data sizes of all compressed partial data compressed with the same compression parameter value for each compression parameter value in accordance with the program stored in the ROM 21. Then, in STEP S13, the CPU 22 selects compressed partial data compressed with a compression parameter value for which the total of the data sizes of the compressed partial data is not larger than a given threshold and which is the closest value to the threshold.

Figure 5:
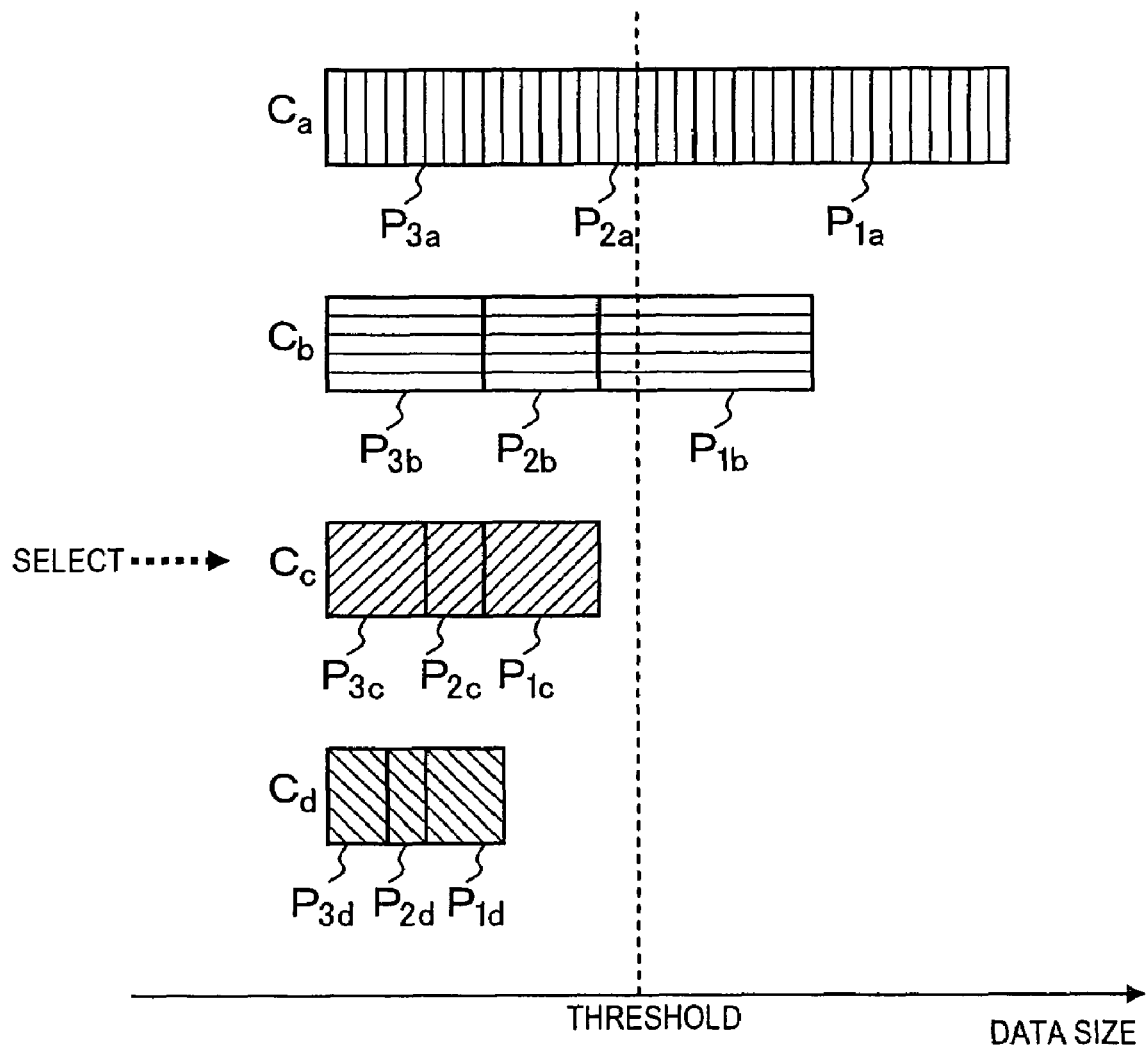
FIG. 5 is a diagram illustrating measurement of the total data size of compressed partial data and selection of compressed partial data used for a final output.

Next, STEPS S12 and S13 will be described by use of FIG. 5. FIG. 5 is a schematic diagram illustrating compressed partial data stored in the RAM 9. As shown in FIG. 5, in the RAM 9, compressed partial data using the same compression parameter value are collectively stored in the same area. In FIG. 5, $C_a$ represents a group of compressed partial data compressed with a compression parameter value $Q_a$, and $C_b$ represents a group of compressed partial data compressed with a compression parameter value $Q_b$. Similarly, $C_c$ represents a group of compressed partial data compressed with a compression parameter value $Q_c$, and $C_d$ represents a group of compressed partial data compressed with a compression parameter value $Q_d$. The horizontal direction in FIG. 5 indicates a data size, and in this example, the data size of $C_a$ is the largest and the data size of $C_d$ is the smallest. The CPU 22 calculates the total data sizes of $C_a$, $C_b$, $C_c$ and $C_d$ in accordance with the program stored in the ROM 21 (STEP S12). It can be seen that in the example illustrated in FIG. 5, $C_2$ has a data size which is not larger than a given threshold and which is the closest to the threshold. Thus, the CPU 22 selects $C_2$ in accordance with the program stored in the ROM 21. When the total of the data sizes of the compressed partial data is larger than the threshold for all of the compression parameter values used, i.e. when the total of the data sizes of $C_a$, $C_b$, $C_c$ or $C_d$ is larger than the threshold in the example of FIG. 5, a group of compressed partial data whose total data size is the smallest is selected (in this example, $C_d$ is selected.)

Returning to FIG. 2, in STEP S14, the CPU 22 prepares a compressed image data file which is a final output from the selected compressed partial data in accordance with the program stored in the ROM 21. The compressed image data file includes compression information of the entire original image data 12. Further, when a JPEG format is used as the predetermined format, the compressed image data file is so constituted as to be a file format defined in JPEG standard. Thereby, preparation of the compressed image data file is completed (STEP S15). The prepared compressed image data file is output to an external storage unit.

Although only three partial image data $P_1$, $P_2$ and $P_3$ are described as portions of image data in the above description, it should be understood that the image data is actually constituted by a considerably large number of portions. For example, image data of UXGA, i.e. 1600 pixels×1200 pixels, is considered as image data to be compressed, and a portion having a size of 8 pixels×8 pixels is considered as the partial data. In this case, since image data is constituted by three planes of RGB or YUV, the image data is constituted by (1600/8)×(1200/8)×3=90,000 partial data. Even when ¾ data of the U and V components are discarded when compression in JPEG format is used, 45,000 partial data from the image data must be processed to obtain a final compressed image data file.

Another embodiment may be constituted as follows to calculate the total of the data sizes of all compressed partial data compressed with the same compression parameter value. First, the interleave compression section 6 is provided with a function of determining the data size of prepared compressed partial data and is so constituted as to output the compressed partial data with the determined data size value attached thereto. Then, the memory controller 8 is provided with a function of adding a data size value attached to compressed partial data each time the compressed partial data is input. As a matter of course, the addition is carried out for each compression parameter value used for compression of the compressed partial data. The added values are stored in appropriate locations in the RAM 9. With such a constitution, after the memory controller 8 processes all compressed partial data prepared from the image data 12, the CPU 22 can determine a compression parameter value which implements an optimum data size simply by reading an added value stored in the location in the RAM 9, whereby the throughput of the CPU 22 can be decreased.

In still another embodiment, all functions of the data file preparing section 10 can also be implemented by software. That is, when compressed partial data output from the interleave compression section 6 are stored in the RAM 9, the compressed partial data may be stored in the RAM 9 in the order they are input into the data file preparing section 10 without classifying them by compression parameter values used for compression. In this case, the CPU 22 must cooperate with the program stored in the ROM 21 to group the compressed partial data in the RAM 9 by the compression parameter values used for compression and calculate the totals of the data sizes of the data.

Embodiment 1

Figure 6:
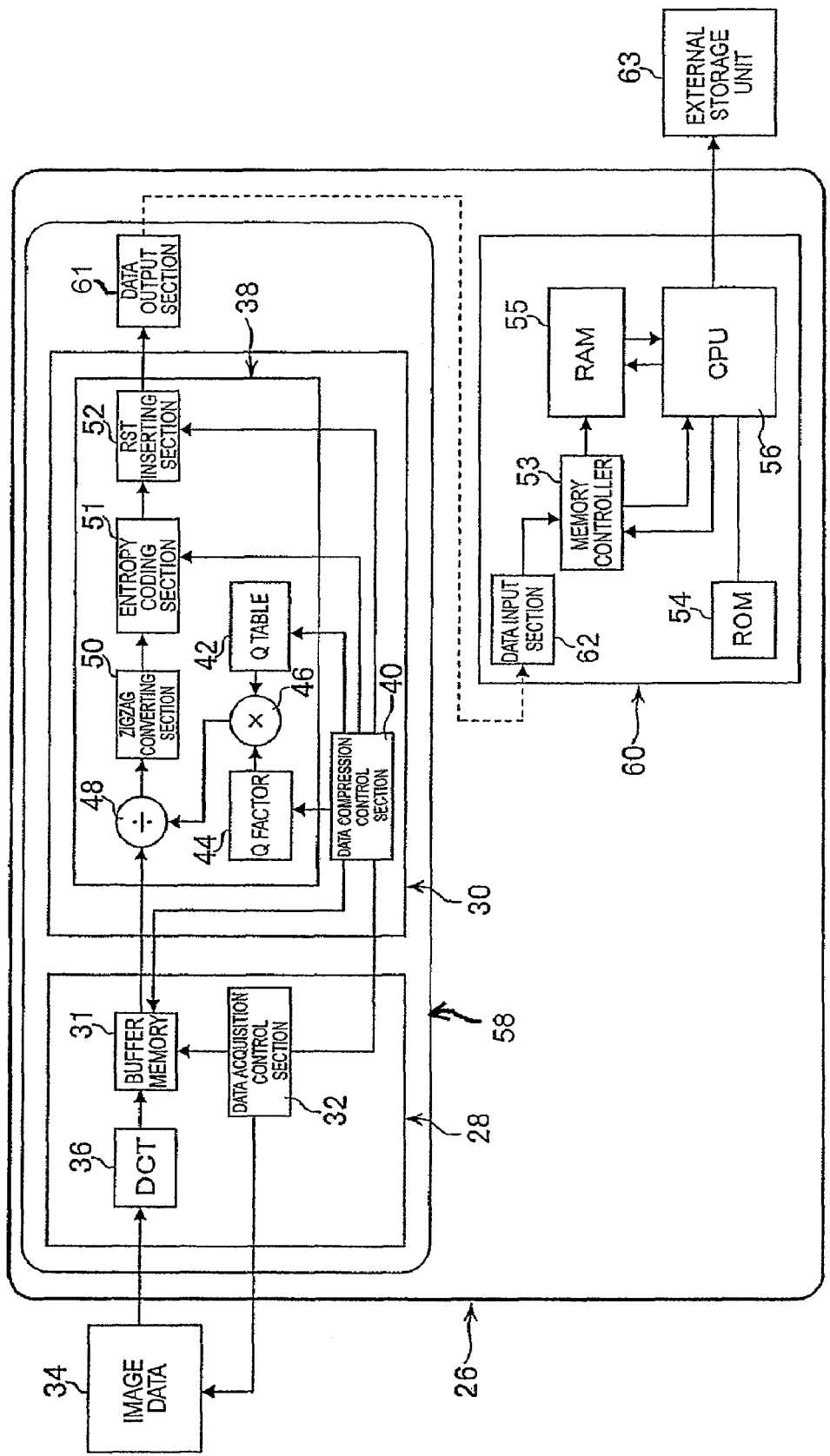
FIG. 6 is a schematic diagram illustrating the hardware configuration of an image data compression device according to an embodiment 1 of the present invention which prepares a compressed image data file in JPEG format.

Embodiment 1 illustrates an example of practicing the present invention as an image data compression device which compresses image data to prepare a compressed image data file in JPEG format. FIG. 6 is a schematic diagram showing the hardware configuration of the image data compression device. An image data compression unit 26 comprises a partial data acquiring section 28, an interleave compression section 30, a RAM 9 and a data file preparing section 60, as in the case of the above-described image data compression device 2.

The partial data acquiring section 28 in the present embodiment comprises a buffer memory 31 and a data acquiring section control section 32, as in the case of the partial data acquiring section 4 in the image data compression device 2 of FIG. 1. These functions are the same as those of the partial data acquiring section 4 in the image data compression device 2 of FIG. 1 except for two additional functions. One of the additional functions is a function that the data acquiring section control section 32 carries out a thinning process defined in JPEG format while it is taking in partial data from image data 34 to be compressed. That is, the data acquiring section control section 32 is so constituted as not to take portions of the image data 34 to be compressed which are to be discarded without compression in JPEG format into the buffer memory 31. The other additional function is to carry out DCT (discrete cosine transform) before storing the taken-in partial data in the buffer memory 31. For this purpose, the partial data acquiring section 28 comprises a DCT circuit 36.

The interleave compression section 30 in the present embodiment comprises a data compression circuit 38 and a data compression control section 40, as in the case of the interleave compression section 6 in the image data compression device 2 of FIG. 1. These functions are the same as those of the interleave compression section 6 in the image data compression device 2 of FIG. 1 except that the interleave compression section 30 in the present embodiment is optimized to use a JPEG format as a compression format. The data compression circuit 38 comprises a Q table storing section 42, a Q factor storing section 44, a multiplier 46, a divider 48, a zigzag converting section 50, an entropy coding section 51 and an RST inserting section 52. Q factors and a Q table are compression parameters defined in JPEG format, and the size of data after compression is changed by changing the values of these parameters. In the present embodiment, a number of Q factor values are stored in the Q factor storing section 44, and the values of Q factors to be used for quantization can be switched from one to another under the control of the data compression control section 40. As a matter of course, an embodiment is also conceivable in which a number of Q tables are stored in the Q table storing section 42 and the Q tables can be switched from one to another. While the Q factors are coefficients, the Q table is a matrix. Therefore, the terms "compression parameter values" in the above description include a possibility of being a matrix. Unlike an RST inserting section in a conventional JPEG compression device, the RST inserting section 52 gives the same RST marker to all of partial data compressed with the same Q factor and gives different RST markers to partial data compressed with different Q factors. That is, the RST marker is inserted as an identification marker for identifying a compression parameter value used for compression, i.e. the value of a Q factor. For example, RST1 is given to all of partial data compressed with a Q factor of 1, and RST2 is given to all of partial data compressed with a Q factor of 2.

The data file preparing section 60 in the present embodiment comprises a memory controller 53, a ROM 54, a RAM 55 and a CPU 56, as in the case of the data file preparing section 10 in the image data compression device 2 of FIG. 1. These functions are the same as those of the data file preparing section 10 in the image data compression device 2 of FIG. 1 except that the data file preparing section 60 in the present embodiment prepares a compressed image data file which is a final output of the image data compression unit 26 in standard JPEG file format. The RAM 55 stores compressed partial data which is output from the interleave compression section 30. The memory controller 53 allocates the addresses of storage locations in the RAM 55 to the compressed partial data output from the interleave compression section 30 according to Q factor values used for compression so that partial data compressed with the same Q factor value are collectively stored in the same area in the RAM 9. The ROM 54 stores a program which causes the CPU 56 to operate as an information processing unit. The CPU 56 checks the data stored in the RAM 55, calculates the total of the data sizes of all partial data compressed with the same Q factor value for each Q factor value, and selects partial data compressed with a Q factor value for which the above total is not larger than a given threshold and which is the closest to the threshold, in accordance with the program stored in the ROM 54. Then, in accordance with the program stored in the ROM 54, the CPU 56 prepares a compressed image data file which is a final output of the image data compression unit 26 in standard JEPG file format from the selected compressed partial data. At this point, the CPU 56 and the program stored in the ROM 54 must remove the RST markers given as markers for identifying the Q factor value used for compression from the selected compressed partial data and gives new RST markers in accordance with JPEG standard. The compressed image data file prepared by the CPU 56 in accordance with the program stored in the ROM 54 is equivalent to a compressed image data file prepared by a conventional JPEG compression device by compressing the entire image data 34 in JPEG format and can be handled by a personal computer or the like as image data.

Further, the image data compression unit 26 in the present embodiment is characterized in that it is separated into an image data compression section 58 which performs compression and the data file preparing section 60 which prepares a compressed image data file which is a final output from interleaved compressed partial data. The present invention can be practiced as such an embodiment, and the embodiment is convenient when the image data compression device according to the present invention is incorporated into a camera-equipped electronic device whose camera portion and other portion are produced separately. For example, in a camera-equipped cellular phone whose camera module and telephone module are produced separately, an embodiment is conceivable in which the image data compression section 58 is incorporated into the camera module and the data file preparing section 60 is incorporated into the telephone module. By implementing the cellular phone in such a form, a reduction in the size of the camera module can be achieved, and the CPU 56 and the RAM 55 can also be used as a CPU and a RAM which are required by the telephone module. The image data compression section 58 comprises a data output section 61 which outputs compressed partial data, and the data file preparing section 60 comprises a data input section 62 which inputs the compressed partial data. The data output section 61 not only outputs compressed partial data prepared by the interleave compression section 30 but also shapes the compressed partial data according to the specification of interface between the data output section 61 and the data input section 62. The data input section 62 unshapes the compressed partial data shaped by the data output section 61 and passes the unshaped compressed partial data to the memory controller 53.

Figure 7:
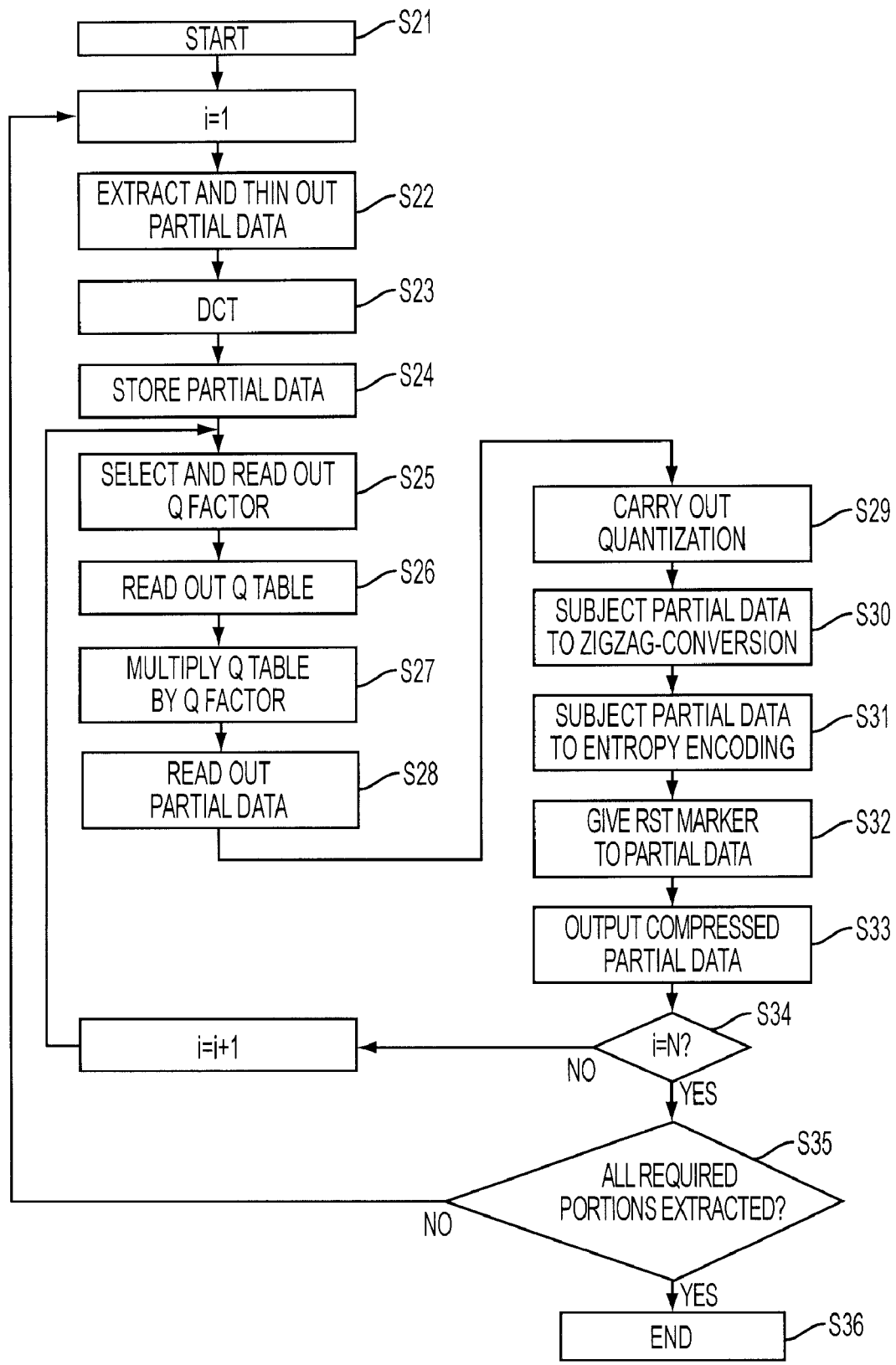
FIG. 7 is a flowchart illustrating the operation of an interleave compression section in the embodiment 1.

Next, the operation of the image data compression section 58 in the image data compression unit 26 according to the present invention will be described by use of a flowchart of FIG. 7.

First, processing is started in STEP S21. In STEP S22, the data acquisition control section 32 extracts a portion of a predetermined size from the image data 34 to be compressed that is stored in storage means. If the portion is to be discarded by the setting of JPEG, the portion is not extracted and the next required portion is extracted. The extracted partial data is converted into data of frequency domain by the DCT circuit 36 (STEP S23) and stored in the buffer memory 31 (STEP S24). In STEP S25, the data compression control section 40 selects and reads out an appropriate Q factor value from the Q factor storing section 44. In STEP S26, the data compression control section 40 reads out a Q table from the Q table storing section 42. In STEP S27, the Q table read out in STEP S26 is multiplied by the Q factor selected and read out in STEP S25 in the multiplier 46. In STEP S28, the data compression control section 40 reads out the partial data stored in the buffer memory 31. In STEP S29, the partial data read out in STEP S28 is divided by the Q table multiplied by the Q factor in STEP S27 in the divider 48. In STEP S28, so-called quantization in JPEG format is carried out.

In STEP S30, the quantized partial data is subjected to zigzag-conversion in the zigzag converting section 50, and in STEP S31, the zigzag-converted partial data is subjected to entropy coding in the entropy coding section 51. In STEP S32, an RST marker is given to the entropy-coded partial data in the RST inserting section 52. In STEP S32, unlike giving of RST marker in a conventional JPEG compression device, the same RST marker is given to all of partial data compressed with the same Q factor value, and different RST markers are given to partial data compressed with different Q factor values. That is, in the present embodiment, the RST marker is used as an identification marker for identifying a Q factor value used for compression. As a matter of course, a marker other than the RST marker may be defined and used. In STEP S32, compressed partial data is completed. In STEP S33, the data output section shapes the compressed partial data according to the specification of interface between the data output section 61 and the data input section 62 and outputs the shaped compressed partial data to the data file preparing section 60.

In STEP S34, it is determined whether the data compression control section 40 has repeated STEPS S25 to S33 for a predetermined number of times. If not, the data compression control section 40 returns to STEP S25. The data compression control section 40 selects a Q factor value different from the previously selected Q factor values from the Q factor storing section each time STEP S25 is repeated. As a result, each time STEPS S25 to S33 are repeated, the interleave compression section 30 prepares a number of compressed partial data compressed with different Q factor values from the same partial data, and these compressed partial data are output from the data output section 61 sequentially. After STEPS S25 to S33 are repeated for the number of Q factors used, it is determined in STEP S35 whether all required portions of the image data 34 to be compressed have been extracted. If not, the image data compression section 58 returns to STEP S22, and the data acquisition control section 32 discards the partial data stored in the buffer memory 31, extracts partial data different from the previously extracted partial data from the image data 34 to be compressed and stores the newly extracted partial data in the buffer memory 31. STEPS S25 to S33 are also repeated for the partial data which has been newly stored in the buffer memory 31 for the number of Q factor values used, and a number of compressed partial data compressed with different Q factor values are prepared from this partial data. As a result of repetitions in STEPS S34 and S35, data output from the data output section 61 is an output resulting from interleaving data compressed with a Q factor value by data compressed with another Q factor value. The contents of the data are similar to those illustrated in FIG. 4. Upon completion of processing of the entire image data 34 to be compressed, compression processing is ended (STEP S36).

Figure 8:
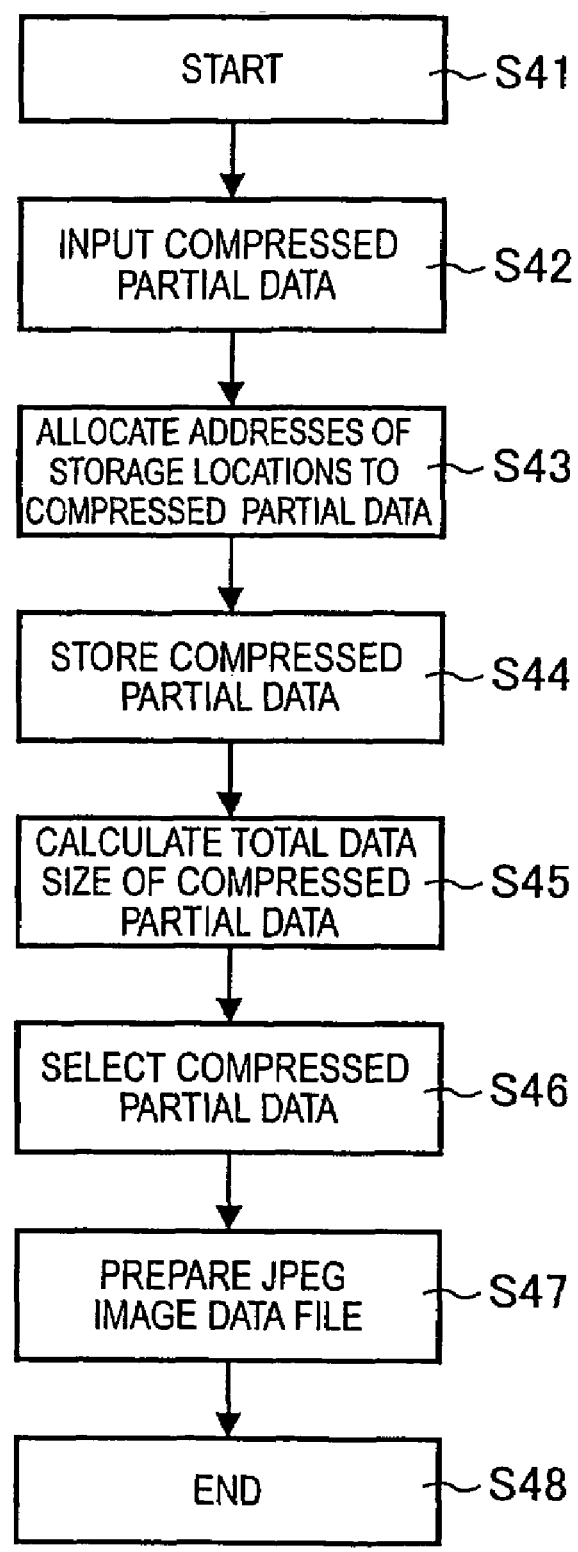
FIG. 8 is a flowchart illustrating the operation of a data file preparing section in the embodiment 1.

Next, the operation of the data file preparing section 60 in the image data compression device 26 in the present embodiment will be described by use of a flowchart of FIG. 8. In STEP S41, processing is started. In STEP S42, compressed partial data output from the data output section 61 are input into the data input section 62. These compressed partial data which have been shaped according to the above interface specification are unshaped in the data input section 62. In STEP S43, the memory controller 53 specifies the addresses of locations at which the compressed partial data are stored in the RAM 55. At that time, the memory controller 53 allocates the addresses of the storage locations to the compressed partial data so that partial data compressed with the same Q factor value are collectively stored in the same area in the RAM 55. In STEP S44, the compressed partial data are stored in the RAM 55 sequentially. Upon completion of storage of all compressed partial data sent from the image data compression section 58, the memory controller 53 notifies the CPU 56 of completion of storage of the compressed partial data.

In STEP S45, the CPU 56 checks the compressed partial data stored in the RAM 55 and calculates the total of the data sizes of all compressed partial data compressed with the same Q factor value for all Q factor values used for compression, in accordance with the program stored in the ROM 54. Then, in STEP S46, the CPU 56 selects compressed partial data compressed with a Q factor value for which the total of the data sizes of the compressed partial data is not larger than a given threshold and which is the closest value to the threshold, in accordance with the program stored in the ROM 54. If the total of the data sizes of the compressed partial data is larger than the threshold for all of the Q factor values used, the CPU 56 selects compressed partial data compressed with a Q factor value for which the total is the smallest. In STEP S47, in accordance with the program stored in the ROM 54, the CPU 56 removes the RST markers given as markers for identifying the Q factor value used for compression from the selected compressed partial data and gives new RST markers in accordance with JPEG standard to prepare a compressed image data file which is a final output in JPEG format. Thereby, the operation of the data file preparing section 60 is completed (STEP S48). The prepared compressed image data file is output to and stored in an appropriate external storage unit 63.

Embodiment 2

Embodiment 2 illustrates an example of a camera-equipped cellular phone according to the present invention.

Figure 9:
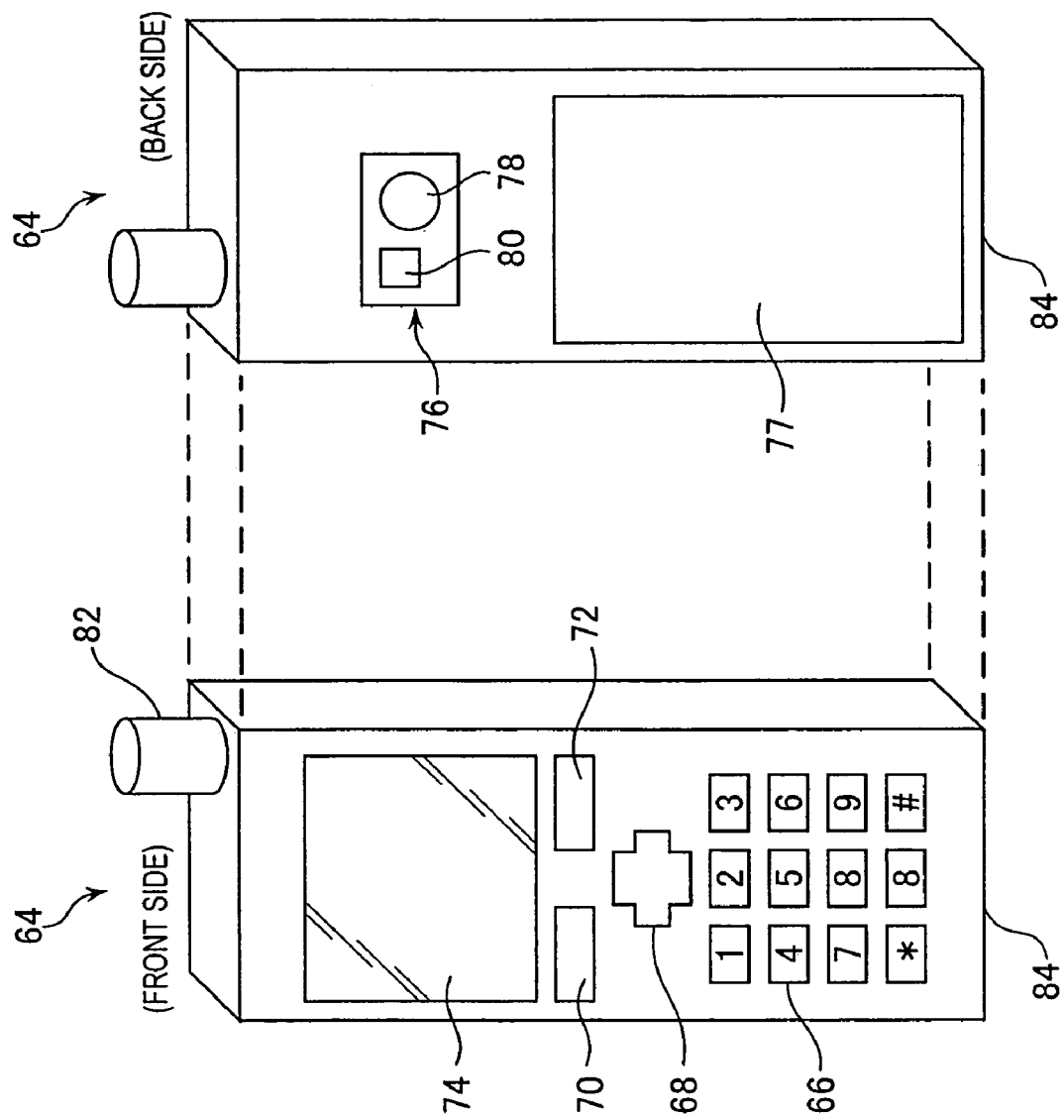
FIG. 9 is an external view of a camera-equipped cellular phone according to an embodiment 2 of the present invention.

FIG. 9 is an external view of a camera-equipped cellular phone to which the present invention is applied. A camera-equipped cellular phone 64 has, on its front side, alphanumeric keys 66 for inputting a telephone number or mail text, a function key 68 for operating various functions provided in the camera-equipped cellular phone, an on-hook key 70 for ending a telephone call, an off-hook key 72 for answering an incoming call or making a phone call and a display 74, and has a camera module 76 and a battery box cover 77 on its back side. The camera module 76 has a lens 78 and a flash lamp 80. Further, the cellular phone 64 also has an antenna 82 at its top and a case 84 which holds the above components together. The camera-equipped cellular phone 64 can have various other functions such as a telephone book, a calculator, a date book and games, in addition to a telephone function and a camera function. To operate these functions, the alphanumeric keys 66, function key 68, on-hook key 70 and off-hook key 72 each serve multiple functions.

Figure 10:
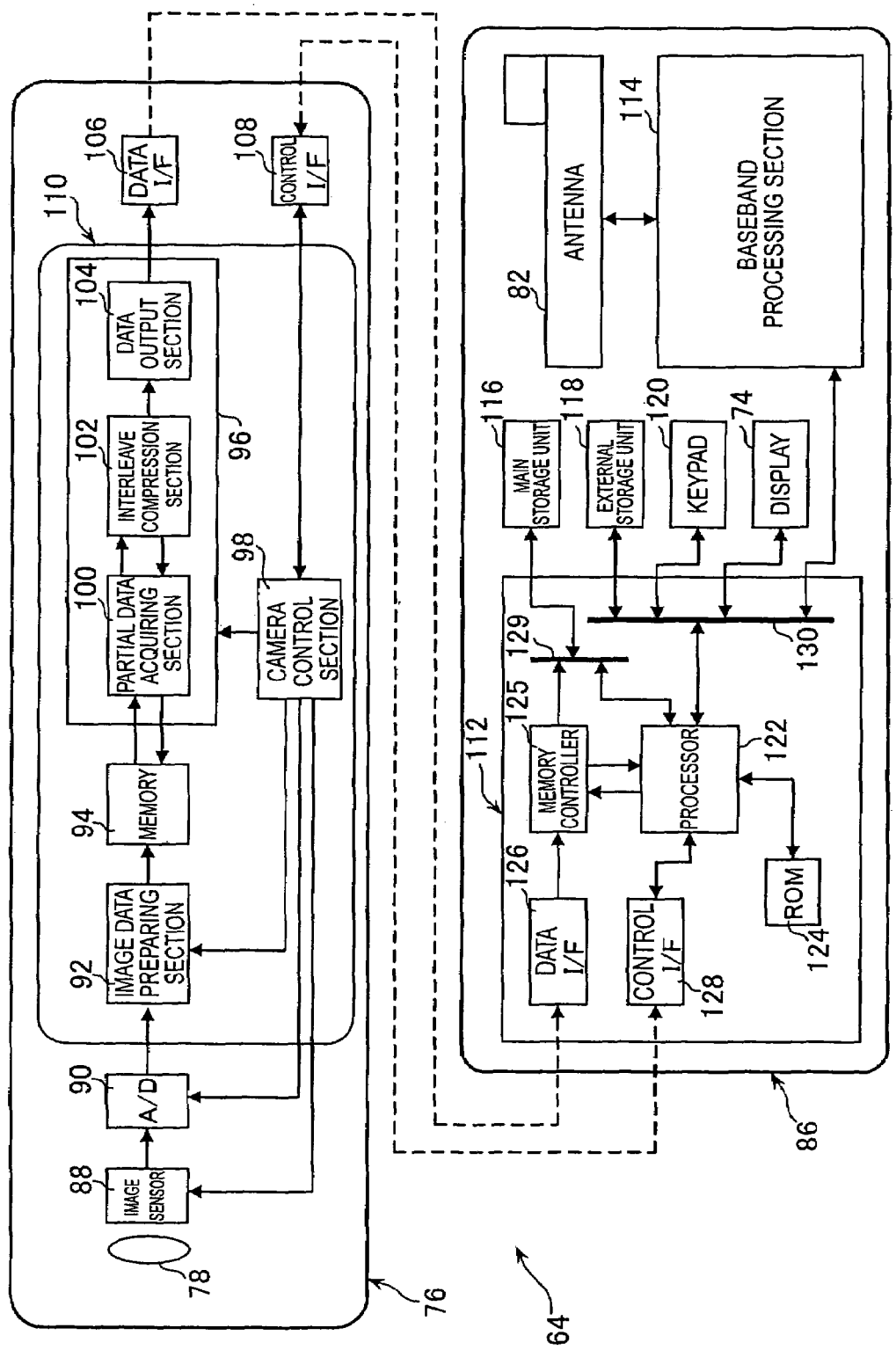
FIG. 10 is a schematic diagram illustrating the hardware configuration of the camera-equipped cellular phone according to the embodiment 2.

FIG. 10 is a schematic diagram illustrating the hardware configuration of the camera-equipped cellular phone 64 according to the present invention. The camera-equipped cellular phone 64 comprises the camera module 76 which takes an image and prepares image data and a host module 86 which stores the image data and has a telephone function and a PDA function. The camera module 76 comprises the lens 78, an image sensor 88 which converts light having entered through the lens 78 into an electrical signal, an A/D converter 90 which digitizes the signal output from the image sensor 88, an image data preparing section 92 which prepares image data from the digitized signal output from the image sensor 88 by color interpolation, and a memory 94 which stores the image data prepared by the image data preparing section 92 temporarily. A signal output from the image sensor 88 becomes image data which can be displayed by use of a personal computer or printed by use of a printer for the first time after processed by the image data preparing section 92. The image data preparing section 92 can be so constituted as to prepare image data not by one frame at a time but by a predetermined number of lines, e.g. 16 lines, at a time. Prepared portions of image data are stored in the memory 94 sequentially.

The camera module 76 further comprises an image data compression section 96. The image data compression section 96 is the same as the image data compression section 58 of the compressed image data file preparing device according to the present invention which has been described in Embodiment 1 and performs interleave compression using a JPEG format which has been described in FIG. 7. However, the image data compression device 96 is different from the image data compression section 58 in Embodiment 1 in that the image data compression device 96 operates under the control of a camera control section 98 to be described later as a whole. As in the case of the image data compression section 58, the image data compression section 96 comprises a partial data acquiring section 100, an interleave compression section 102 and a data output section 104. These are the same as the partial data acquiring section 28, interleave compression section 30 and data output section 61 of the compressed image data file preparing device 26 which has been described in Embodiment 1, respectively.

The camera module 76 further comprises a camera control section 98 which controls the functions of the camera module 76. The camera control section 98 comprises a CPU and software which operates the CPU and receives a command from the host module 86 and thereby controls the image sensor 88, A/D converter 90, image data preparing section 92 and image data compression section 96. Interleave-compressed image data is sent to the host module 86 through a camera-side data I/F 106, and control information of the camera module 76 and the host module 86 is exchanged through a camera-side control I/F 108. In an optimum embodiment, the image data preparing section 92 and the image data compression section 96 are preferably constituted as hardware circuits. Further, these hardware circuits and the camera control section 98 are preferably integrated and constituted as one LSI chip as a photographing control unit 110.

The host module 86 comprises an application processing section 112, a baseband processing section 114 which controls a telephone function, the antenna 82, a main storage unit 116 such as a DRAM, an external storage unit 118 which is a storage unit suited for long-term data storage such as an SD card or MMC card, a keypad 120 which comprises the keys 66, 68, 70 and 72, and the display 74. The application processing section 112 comprises a processor 122, a ROM 124 which stores a program for operating the processor 122, a memory controller 125, a host-side data I/F 126 which receives data sent from the camera module 76, a host-side control I/F 128 which is a path for exchanging control information between the host module 86 and the camera module 76, and a bus 130. Further, the main storage unit 116 is connected to the processor 122 and the memory controller 125 through a bus 129, and the external storage unit 118, the key pad 120 and the display 74 are connected to the processor 122 through the bus 130. The program stored in the ROM 124 cooperates with the processor 122 to implement the same function as that of the data file preparing section 60 of the image data compression device 26 which has been described in Embodiment 1 and implement various other functions such as a telephone book, a calculator, a date book and games.

The camera module 76 is directly controlled by the camera control section 98. The camera control section 98 receives a command from the application processing section 112 to implement control of the camera module 76. For example, when a shutter button in the keypad 120 is pressed, the application professing section 112 detects the press and sends a command to take an image to the camera control section 98 through the host-side control I/F 128 and the camera-side control I/F 108. Upon receipt of the command, the camera control section 98 interprets the command and directly controls the image sensor 88, the A/D converter 90, the image data preparing section 92 and the image data compression section 96 to implement photographing and preparation and compression of image data.

Figure 11:
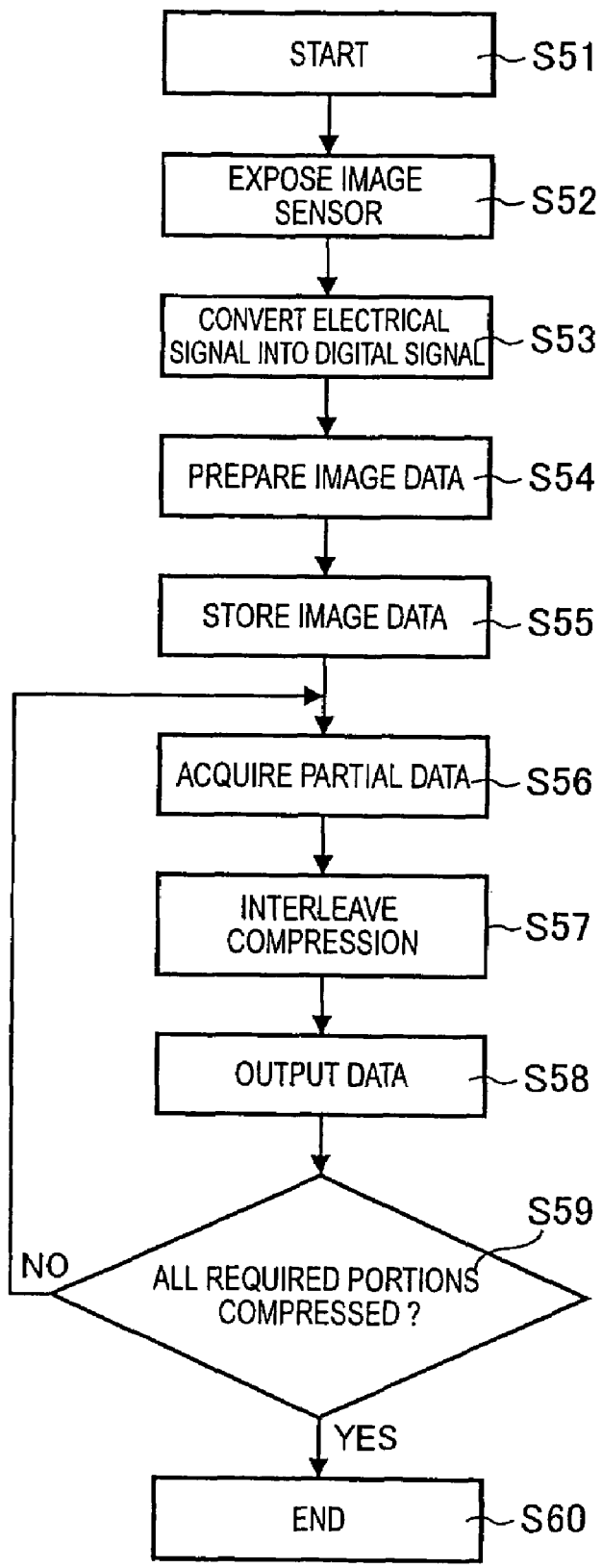
FIG. 11 is a flowchart illustrating the operation of a camera module in the embodiment 2.

Next, the operation of the camera module 76 when photographing is carried out by use of the camera-equipped cellular phone 64 in the present embodiment will be described by use of a flowchart of FIG. 11.

First, photographing is started in STEP S51. In STEP S52, the image sensor 88 is exposed. In STEP S53, an electrical signal output from the image sensor 88 is converted into a digital signal. In STEP S54, the image data preparing section 92 prepares image data which can be handled by a personal computer and a printer from the digitized signal output from the image sensor 88. The prepared image data is stored in the memory 94 (STEP S55). In STEP S56, the partial data acquiring section 100 extracts partial data of a predetermined size from the memory 94, subjects the partial data to DCT and stores the partial data inside. This process is the same as those described in STEPS S22 to S24 in FIG. 7. In STEP S57, the interleave compression section 102 prepares a number of compressed partial data compressed with different Q factor values from the partial data stored in the partial data acquiring section 100. This process is the same as those described in STEPS S25 to S32 in FIG. 7. In STEP S58, the compressed partial data prepared by the interleave compression section 102 are shaped according to the specification of the data I/F and output from the data output section 104 sequentially. In STEP S59, it is determined whether all required portions of the image data 34 to be compressed have been compressed. If not, STEPS S56 to S58 are carried out again. Otherwise, processing is ended (STEP S60).

In STEP S54, the image data preparing section 92 prepares image data not by one frame at a time but by a predetermined number of lines, e.g. 16 lines, at a time. Although prepared portions of the image data are stored in the memory 94, the photographing control unit 110 can be so constituted as to interleave-compress all portions of the image data which are stored in the memory 94 before the next prepared portion of the image data is stored in the memory 94. By constituting the photographing control unit 110 as described above, it is sufficient that the memory 94 has a capacity of storing, for example, 16 lines, leading to reductions in the space of the camera module and production costs.

Figure 12:
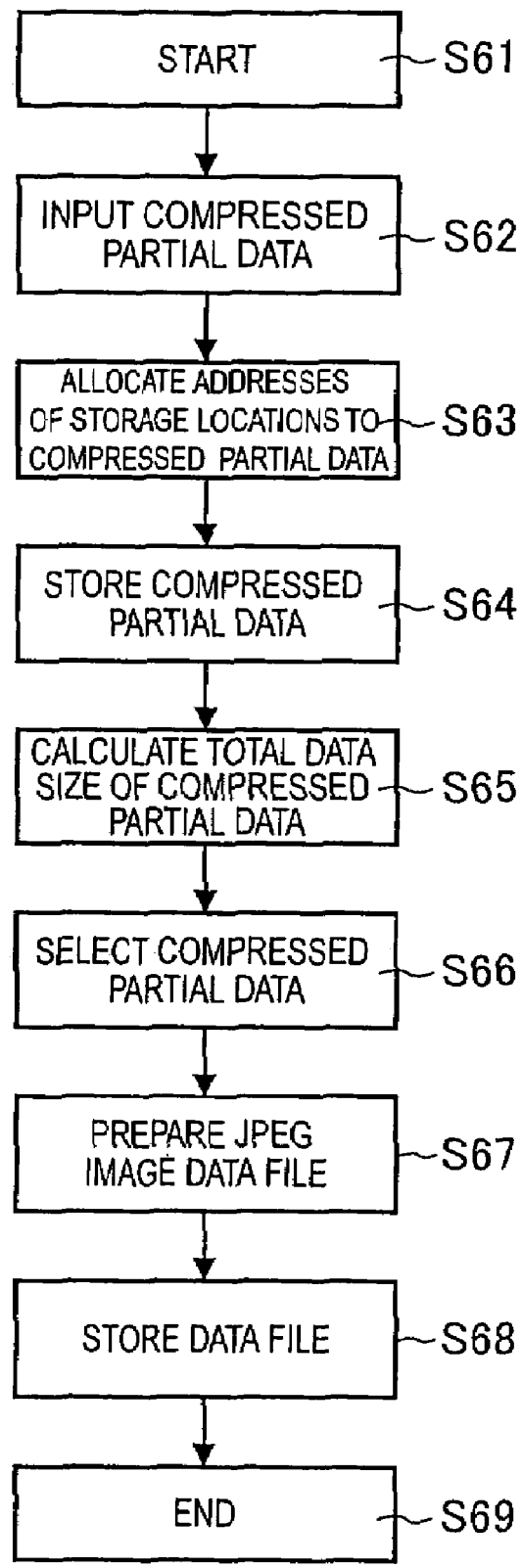
FIG. 12 is a flowchart illustrating the operation of a host module in the embodiment 2.
Figure 13:
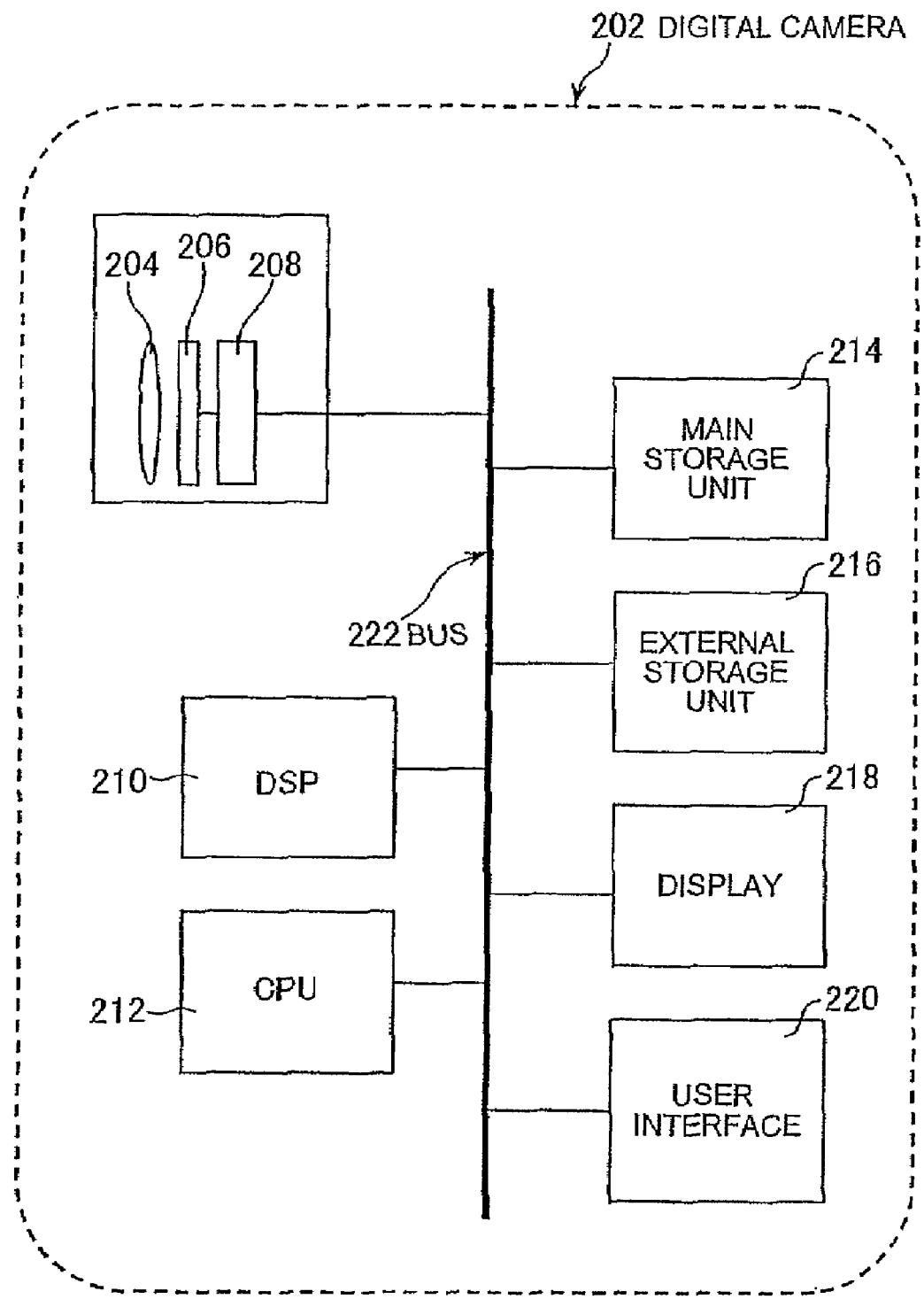
FIG. 13 is a block diagram illustrating a digital camera according to the prior art.

Next, the operation of the host module 86 when a picture is taken by the camera-equipped cellular phone 64 in the present embodiment will be described by use of a flowchart of FIG. 12. Hereinafter, only an operation thereof associated with processing of compressed partial data output from the camera module 76 will be described.

In STEP S61, processing is initiated. In STEP S62, a series of compressed partial data are input into the camera module 76 through the camera-side data I/F 106 and the host-side data I/F 126. These compressed partial data which have been shaped according to the specification of the above interface are unshaped in the data input section 62. In STEP S63, the memory controller 125 specifies the addresses of storage locations of the compressed partial data in the main storage unit 116. At that time, the memory controller 125 allocates the addresses of storage locations to the compressed partial data so that compressed partial data compressed with the same Q factor value are collectively stored in the same area in the main storage unit 116. In STEP S64, the compressed partial data are stored in the main storage unit 116 sequentially. Upon completion of storage of all compressed partial data sent from the image data compression section 58, the memory controller 125 notifies the processor 122 of completion of storage.

In STEP S65, the processor 122 checks the compressed partial data stored in the main storage unit 116 and calculates the total of the data sizes of all compressed partial data compressed with the same Q factor value for all Q factor values used for compression, in accordance with the program stored in the ROM 124. Then, in STEP S66, the processor 122 selects compressed partial data compressed with a Q factor value for which the total of the data sizes of the compressed partial data is not larger than a given threshold and which is the closest value to the threshold, in accordance with the program stored in the ROM 124. If the total of the data sizes of the compressed partial data is larger than the threshold for all of the Q factor values used, the processor 122 selects compressed partial data compressed with a Q factor value for which the total is the smallest. In STEP S67, in accordance with the program stored in the ROM 124, the processor 122 removes the RST markers given as markers for identifying the Q factor value used for compression from the selected compressed partial data and gives new RST markers in accordance with JPEG standard to prepare a compressed image data file which is a final output in JPEG format. In STEP S69, the prepared compressed image data file in JPEG format is stored in the external storage unit 118, thereby ending the processing (STEP S69).

The camera-equipped cellular phone 64 preferably previews photographed and prepared image data on the display 74. Several constitutions can be conceived to impart such a function, and the following constitution can be adopted, for example. First, all digitized signals output from the image sensor 88 are stored in appropriate storage means once. The image data preparing section 92 reads out the stored output signals from the storage means and resizes the signals to prepare image data for preview. Thereafter, the image data preparing section 92 reads out the output signals of the image sensor 88 from the storage means again to prepare image data to be stored and then subjects the prepared image data to interleave compression. Since the image data for preview has low resolution (e.g. 240 pixels×120 pixels), the image data for preview does not need to be compressed by the image data compression section 96. The image data for preview is sent to the host module 86 before all compressed partial data.

In another constitutional example, it is conceivable to impart a function of preparing image data for preview to the image data compression section 96. In this constitutional example, the image data compression section 96 is so constituted as to prepare partial data for preview image by simply reducing the resolution of partial data stored in the partial data acquiring section 100, output the partial data for preview image from the data output section and then compress the partial data. That is, in this constitution, the partial data for preview image and a number of compressed partial data are output which are prepared from the same partial data are output from the camera module 76 sequentially. The partial data for preview image does not need to be prepared for all partial data stored in the partial data acquiring section 100, and it is sufficient that the partial data for preview image is prepared for some of the partial data. In this constitutional example, the processor 122 must have a function of preparing preview image data to be displayed on the display 74 from partial data for preview image which are stored in different areas in the main storage unit 116 in accordance with the program stored in the ROM 124.

The embodiments of the present invention have been described above. It is needless to say that the embodiments described above are merely embodiments for practicing the present invention and various other embodiments are also possible. For example, the compression format used in the present invention is not limited to JPEG. Further, even when JPEG is used, an embodiment which uses a Huffman table as a compression parameter which is changed in interleave compression and an embodiment which uses a marker other than RST as a marker indicating a compression parameter value used for compression are also possible. In JPEG standard, markers which are applicable as the above marker are defined, in addition to RST. Further, the embodiments of the present invention are not limited to hardware. The present invention can also be practiced as computer software incorporating the method for preparing a compressed image data file according to the present invention. In addition, although the present invention can be suitably applied to electronic devices including camera-equipped cellular phones, PDAs and portable computers, the present invention is not limited to those electronic devices and can also be applied to a digital camera 202 which is a device used specifically for photography and other devices. In any case, various embodiments can be practiced without departing from the scope of the present invention.

What is claimed is:

1. A method to be implemented in a digital processor, comprising:
   extracting a plurality of partial data of a predetermined size from image data,
   preparing a predetermined number of compressed partial data compressed with different compression parameter values from each partial data by repeating preparation of compressed partial data by compressing each said partial data in a predetermined JPEG format for the predetermined number of times with the compression parameter value used in the predetermined format changed for each compression, and
   calculating, for each of the different compression parameter values, the total of the data sizes of all of the compressed partial data compressed with the same compression parameter value and preparing a compressed image data file from compressed partial data compressed with the same compression parameter value for which the total is not larger than a given threshold and which is the closest value to the threshold,
   wherein each compressed partial data includes RST markers defined in JPEG format indicating the compression parameter values used for compression to the compressed partial data.

2. The method according to claim 1, wherein when the total is larger than the threshold for all of the compression parameter values, the compressed image data file is prepared from compressed partial data compressed with a compression parameter value for which the total is the smallest.

3. The method according to claim 1, wherein the compression parameters are Q factors or Q tables defined in JPEG format.

4. An apparatus, comprising:
   partial data acquiring section,
   interleave compression section, and
   data file preparing section,
   wherein
   the partial data acquiring section acquires a plurality of partial data of a predetermined size from image data,
   the interleave compression section prepares a number of compressed partial data compressed with different compression parameter values from each partial data by repeating preparation of compressed partial data by compressing said each partial data in a predetermined JPEG format for a predetermined number of times with the compression parameter value used in the predetermined format changed for each compression and outputs each compressed partial data sequentially, and
   the data file preparing section calculates, for each of the different compression parameter values, the total of the data sizes of all of the compressed partial data compressed with the same compression parameter value and prepares a compressed image data file from compressed partial data compressed with the same compression parameter value for which the total is not larger than a given threshold and which is the closest value to the threshold,
   wherein the interleave compression section gives markers indicating the compression parameter values used for compression to each compressed partial data and wherein RST markers defined in JPEG format are used as the markers.

5. The apparatus according to claim 4, wherein when the total is larger than the threshold for all of the compression parameter values, the compressed image data file is prepared from compressed partial data compressed with a compression parameter value for which the total is the smallest.

6. The apparatus according to claim 4, wherein the compression parameters are Q factors or Q tables defined in JPEG format.

7. An apparatus, comprising:
   an image data compression section, and
   a data file preparing section,
   wherein
   the data compression section comprises:

a partial data acquiring section,
an interleave compression section, and
a data output section,
the partial data acquiring section takes in a plurality of partial data of a predetermined size from image data and stores the partial data temporarily,
the interleave compression section compresses each partial data stored in the partial data acquiring section in a predetermined format to prepare compressed partial data, wherein the predetermined format is a JPEG format,
the data output section outputs the compressed partial data,
the interleave compression section comprises a number of compression parameter values used in the predetermined format and prepares a number of compressed partial data compressed with different compression parameter values from each said partial data,
the data output section outputs said number of compressed partial data sequentially,
the data file preparing section comprises:
a data input section,
a data storing section,
a data size calculating section,
a data size determining section, and
a data shaping section,
the data input section inputs the output compressed partial data,
the data storing section stores the compressed partial data input from the data input section,
the data size calculating section calculates, for each of the different compression parameter values, the total of the data sizes of all of compressed partial data taken from the same image data and compressed with the same compression parameter value out of the compressed partial data input from the data input section,
the data size determining section determines that a compression parameter value for which the total is not larger than a given threshold and which is the closest value to the threshold is an optimum compression parameter value, and
the data shaping section prepares a compressed image data file from compressed partial data compressed with the optimum compression parameter value,
wherein the interleave compression section gives markers indicating the compression parameter values used for compression to each compressed partial data and wherein RST markers defined in JPEG format are used as the markers.

8. The apparatus according to claim 7, wherein when the total is larger than the threshold for all of the compression parameter values, the data size determining section determines that a compression parameter value for which the total is the smallest is an optimum compression parameter value.

9. The apparatus according to claim 7, wherein the compression parameters are Q factors or Q tables defined in JPEG format.

10. The apparatus according to claim 7, wherein the data shaping section removes the RST markers from the compressed partial data and gives new RST markers to the compressed partial data in accordance with JPEG standard.

11. An apparatus, comprising:
a camera module, and
a host module,
wherein
the camera module comprises:
a sensor section,
an image data preparing section,
a camera-module-side data storing section,
a partial data acquiring section,
an interleave compression section, and
a data transmitting section,
the sensor section converts incoming light into an electrical signal,
the image data preparing section prepares image data from the electrical signal,
the camera-module-side data storing section stores a part or all of the image data temporarily,
the partial data acquiring section takes in a plurality of partial data of a predetermined size from the image data stored in the camera-module-side data storing section and stores the partial data temporarily,
the interleave compression section compresses each partial data stored in the partial data acquiring section in a predetermined format to prepare compressed partial data,
the data transmitting section transmits each said compressed partial data to the host module,
the interleave compression section comprises a number of compression parameter values used in the predetermined format and prepares a number of compressed partial data compressed with different compression parameter values from the partial data,
the data transmitting section transmits said number of compressed partial data sequentially,
the host module comprises:
a data receiving section,
a host-side data storing section,
a data size calculating section,
a data size determining section,
a data shaping section, and
a file storage unit,
the data receiving section receives the data transmitted from the camera module,
the host-side data storing section stores the compressed partial data received by the data receiving section,
the data size calculating section calculates, for each of the different compression parameter values, the total of the data sizes of all of compressed partial data taken from the same image data and compressed with the same compression parameter value out of the compressed partial data received by the data receiving section,
the data size determining section determines that a compression parameter value for which the total is not larger than a given threshold and which is the closest value to the threshold is an optimum compression parameter value,
the data shaping section prepares a compressed image data file from compressed partial data compressed with the optimum compression parameter value, and
the file storage unit stores the compressed image data file.

12. The apparatus according to claim 11, wherein when the total is larger than the threshold for all of the compression parameter values, the data size determining section determines that a compression parameter value for which the total is the smallest is an optimum compression parameter value.

13. The apparatus according to claim 11, wherein the host module has a telephone function.

14. The apparatus according to claim 13, wherein the host module has a telephone function using CDMA.

15. The apparatus according to claim 11, wherein the image data preparing section in the camera module prepares preview image data for preview from the electrical signal before preparing the image data, and the data transmitting section in the camera module transmits the preview image data to the host module before transmitting the compressed partial data, and the host module comprises a display device and receives the preview image data and displays it on the display device.

16. The apparatus according to claim 11, wherein the data compression section in the camera module prepares, for each partial data, data for preview image whose resolution is lower than said each partial data, and the data transmitting section in the camera module transmits the data for preview image prepared from said each partial data and the compressed partial data for said each partial data sequentially, and the host module comprises a display device and stores the data for preview image in the host-side data storing section, prepares image data for preview of the image data from the data for preview image which is stored in the host-side data storing section by the data shaping section and displays the image data for preview on the display device.

17. The apparatus according to claim 11, wherein the interleave compression section gives markers indicating the compression parameter values used for compression to each compressed partial data.

18. The apparatus according to claim 11, wherein the predetermined format is a JPEG format.

19. The apparatus according to claim 18, wherein the compression parameters are Q factors or Q tables defined in JPEG format.

20. The apparatus according to claim 18, wherein an RST marker defined in JPEG format is used as the marker.

21. The apparatus according to claim 20, wherein the data shaping section removes the RST markers from each compressed partial data and gives new RST markers to the compressed partial data in accordance with JPEG standard.

22. An apparatus, comprising:
means for extracting a plurality of partial data of a predetermined size from image data;
means for preparing a predetermined number of compressed partial data compressed with different compression parameter values from each partial data by repeating preparation of compressed partial data by compressing each said partial data in a predetermined JPEG format for the predetermined number of times with the compression parameter value used in the predetermined format changed for each compression; and means for calculating, for each of the different compression parameter values, the total of the data sizes of all of the compressed partial data compressed with the same compression parameter value and preparing a compressed image data file from compressed partial data compressed with the same compression parameter value for which the total is not larger than a given threshold and which is the closest value to the threshold;

wherein each compressed partial data includes RST markers defined in JPEG format indicating the compression parameter values used for compression to the compressed partial data.

23. A computer program product, comprising:
a computer readable medium containing computer executable program code;
computer executable program code in said medium for extracting a plurality of partial data of a predetermined size from image data;
computer executable program code in said medium for preparing a predetermined number of compressed partial data compressed with different compression parameter values from each partial data by repeating preparation of compressed partial data by compressing each said partial data in a predetermined JPEG format for the predetermined number of times with the compression parameter value used in the predetermined format changed for each compression; and
computer executable program code in said medium for calculating, for each of the different compression parameter values, the total of the data sizes of all of the compressed partial data compressed with the same compression parameter value and preparing a compressed image data file from compressed partial data compressed with the same compression parameter value for which the total is not larger than a given threshold and which is the closest value to the threshold;
wherein each compressed partial data includes RST markers defined in JPEG format indicating the compression parameter values used for compression to the compressed partial data.

* * * * *